US011368874B2

(12) United States Patent
Harada

(10) Patent No.: US 11,368,874 B2
(45) Date of Patent: Jun. 21, 2022

(54) TERMINAL AND RADIO COMMUNICATION METHOD

(71) Applicant: NTT DOCOMO, INC., Tokyo (JP)

(72) Inventor: Hiroki Harada, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/771,744

(22) PCT Filed: Dec. 13, 2017

(86) PCT No.: PCT/JP2017/044793
§ 371 (c)(1),
(2) Date: Jun. 11, 2020

(87) PCT Pub. No.: WO2019/116477
PCT Pub. Date: Jun. 20, 2019

(65) Prior Publication Data

US 2020/0404537 A1 Dec. 24, 2020

(51) Int. Cl.
*H04W 28/06* (2009.01)
*H04J 11/00* (2006.01)
*H04W 48/10* (2009.01)

(52) U.S. Cl.
CPC ......... *H04W 28/06* (2013.01); *H04J 11/0073* (2013.01); *H04J 11/0076* (2013.01); *H04W 48/10* (2013.01)

(58) Field of Classification Search
CPC ..... H04W 28/06; H04W 48/10; H04W 76/11; H04J 11/0073; H04J 11/0076
See application file for complete search history.

(56) References Cited

U.S. PATENT DOCUMENTS

2017/0105166 A1 4/2017 Lee et al.
2017/0265156 A1* 9/2017 Xue ...................... H04L 5/0092
2018/0220395 A1 8/2018 Yu et al.
2019/0223163 A1* 7/2019 Ko ........................ H04W 48/12
2019/0387485 A1* 12/2019 Ko ...................... H04W 72/005
2020/0146041 A1* 5/2020 Kim .................. H04W 72/1289

FOREIGN PATENT DOCUMENTS

WO 2015143244 A1 9/2015
WO 2017054161 A1 4/2017

OTHER PUBLICATIONS

Nokia, Alcatel-Lucent Shanghai Bell, (On remaining System Information Delivery) herein Nokia (Year: 2017).*
Office Action issued in the counterpart Russian Patent Application No. 2020121806/07(037407), dated Jan. 12, 2021 (12 pages).
International Search Report issued in Application No. PCT/JP2017/044793, dated Feb. 13, 2018 (3 pages).

(Continued)

*Primary Examiner* — Shukri Taha
(74) *Attorney, Agent, or Firm* — Osha Bergman Watanabe & Burton LLP

(57) ABSTRACT

A terminal is disclosed including a receiver that detects a synchronization signal block including a broadcast channel; and a processor that interprets an information element within the broadcast channel differently depending on whether a condition is met. In other aspects, a radio communication method for a terminal and a base station are disclosed.

5 Claims, 12 Drawing Sheets

SS BURST SET PERIODICITY
SS BURST SET PERIOD
SS BLOCK
0 #1 #2 #3 #4 #5 #6 #7 ...
0 #1 #2 #3 #4 #5 #6 #7 ...
SS BURST
SS BURST
TIME
SS BURST SET

(56) References Cited

OTHER PUBLICATIONS

Written Opinion issued in International Application No. PCT/JP2017/044793, dated Feb. 13, 2018 (4 pages).
3GPP TS 36.300 V8.12.0, Release 8; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2;" Mar. 2010; Sophia Antipolis Valbonne, France (149 pages).
3GPP TSG RAN WG1 Meeting #90; R1-1713123 "Consideration on NR-PBCH contents and payload size" LG Electronics; Prague, Czech Republic; Aug. 21-25, 2017 (4 pages).
3GPP TSG RAN WG1 #91; R1-1721684 "WF on RMSI presence flag" Qualcomm; Reno, U.S.A.; Nov. 27-Dec. 1, 2017 (5 pages).
3GPP TSG RAN WG1 Meeting 90bis; R1-1718329 "Remaining details on PBCH" MediaTek Inc.; Prague, CZ; Oct. 9-13, 2017 (4 pages).
Extended European Search Report issued in European Application No. 17934851.1, dated Jun. 22, 2021 (9 pages).
Office Action issued in counterpart Korean Application No. 10-2020-7017992 dated Oct. 14, 2021 (10 pages).
Qualcomm Incorporated; "PBCH contents and payload size consideration"; 3GPP TSG-RAN WG1 90, R1-1713374; Aug. 21-25, 2017; Prague, Czech Republic (4 pages).
Qualcomm Incorporated; "Remaining details on NR-PBCH"; 3GPP TSG RAN WG1 Meeting 90bis, R1-1718527; 3GPP TSG RAN WG1 Meeting 90bis; Prague, Oct. 9-13, 2017 (7 pages).
Office Action issued in counterpart Japanese Application No. 2019-559475 dated Feb. 8, 2022 (10 pages).
Ericsson; "[99bis#19][NR] L1 parameters in RRC Email Discussion Summary"; 3GPP TSG-RAN WG2 #100, Tdoc R2-1713430; Reno, Nevada, USA; Nov. 27-Dec. 1, 2017 (7 pages).

* cited by examiner

FIG. 2

MIB CONTENTS

| | INFORMATION ELEMENT | BIT SIZE |
|---|---|---|
| PROVIDED FROM HIGHER LAYER | SystemFrameNumber | 6 |
| | subCarrierSpacingCommon | 1 |
| | Ssb-subcarrierOffset | 4 |
| | Dmrs-TypeA-Position | 1 |
| | pdcchConfigSIB1 | 8 |
| | cellBarred | 1 |
| | intraFreqReselection | 1 |
| | spare | 2 |
| GENERATED IN PHYSICAL LAYER | 4 LSBs of SystemFrameNumber | 4 |
| | Ssb-IndexExplicit | 3 |
| | Half-frame-index | 1 |
| | CRC | 24 |
| | TOTAL | 56 |

| | cellBarred/intraFreqReselection | PRESENCE OR ABSENCE OF RMSI | INITIAL ACCESS CAPABILITY | NEXT UE BEHAVIER |
|---|---|---|---|---|
| CASE 1 | notBarred/allowed | PRESENT | CAPABLE | ACCESS TO CELL/CARRIER |
| CASE 2 | notBarred/allowed | PRESENT | INCAPABLE | SEARCH FOR NEXT SS RASTER |
| CASE 3 | Barred/not allowed | ABSENT | INCAPABLE | SEARCH FOR NEXT SS RASTER |
| CASE 4 | Barred/not allowed | PRESENT | INCAPABLE | SEARCH FOR NEXT SS RASTER |

FIG. 5

TERMINAL AND RADIO COMMUNICATION METHOD

TECHNICAL FIELD

The present invention relates to a user terminal and a radio communication method in next-generation mobile communication systems.

BACKGROUND ART

In the UMTS (Universal Mobile Telecommunications System) network, the specifications of Long Term Evolution (LTE) have been drafted for the purpose of further increasing high speed data rates, providing lower latency and so on (see Non-Patent Literature 1). For the purpose of further high capacity and advancement of LTE (LTE Rel. 8, Rel. 9), and so on, the specifications of LTE-A (LTE-Advanced, LTE Rel. 10, Rel. 11, Rel. 12, Rel. 13) have been drafted.

Successor systems of LTE (referred to as, for example, “FRA (Future Radio Access),” “5G (5th generation mobile communication system),” “5G+(plus),” “NR (New Radio),” “NX (New radio access),” “FX (Future generation radio access),” “LTE Rel. 14,” “LTE Rel. 15” (or later versions), and so on) are also under study.

In existing LTE systems (for example, LTE Rel. 8 to Rel. 13), a user terminal (UE (User Equipment)) detects a synchronization signal (PSS (Primary Synchronization Signal) and/or SSS (Secondary Synchronization Signal)) by an initial access procedure (also referred to as “cell search” and the like), and establishes synchronization with a network (for example, radio base station (eNB (eNode B))) and identifies a cell to connect (for example, identifies a cell to connect by a cell ID (Identifier)).

The UE receives a master information block (MIB) transmitted in a broadcast channel (PBCH (Physical Broadcast Channel)), a system information block (SIB) transmitted in a downlink (DL) shared channel (PDSCH (Physical Downlink Shared Channel)) and the like after cell search, to acquire configuration information (which may be also referred to as “broadcast information,” “system information,” and the like) for communication with the network.

CITATION LIST

Non-Patent Literature

Non-Patent Literature 1: 3GPP TS 36.300 “Evolved Universal Terrestrial Radio Access (E-UTRA) and Evolved Universal Terrestrial Radio Access Network (E-UTRAN); Overall Description; Stage 2”

SUMMARY OF INVENTION

Technical Problem

For future radio communication systems (for example, NR or 5G), it is studied to define a resource unit including a synchronization signal and a broadcast channel as a synchronization signal block, and to perform an initial access, based on the SS block. The synchronization signal is also referred to as a “PSS and/or SSS” or “NR-PSS and/or NR-SSS,” and the like. The broadcast channel is also referred to as a “PBCH” or “NR-PBCH,” and the like. The synchronization signal block is also referred to as an “SS block (Synchronization Signal block (SSB))” or “SS/PBCH block,” and the like.

In the initial access using an SS block, it is preferable to signal information as much as possible by a broadcast channel in an SS block. However, the amount of information of a broadcast channel is limited.

The present invention has been made in view of the above, and an object of the present invention is to provide a user terminal and a radio communication method which effectively utilize a broadcast channel in a synchronization signal block in future radio communication systems.

Solution to Problem

A user terminal according to one aspect of the present invention includes a receiving section that receives a synchronization signal block including a broadcast channel from a cell, and a control section that interprets a specific information element in the broadcast channel as a different information element depending on whether or not a specific condition is satisfied.

Advantageous Effects of Invention

According to the present invention, a broadcast channel in a synchronization signal block can be effectively utilized in future radio communication systems.

BRIEF DESCRIPTION OF DRAWINGS

FIG. 2 is a diagram to show an example of MIB contents;

FIG. 5 is a diagram to show an example of cases of SSBs detected at the time of an initial access;

DESCRIPTION OF EMBODIMENTS

For future radio communication systems (for example, LTE Rel. 14 or later versions, 5G or NR, and the like), it is studied to define a signal block (also referred to as an “SS/PBCH block,” an “SS/PBCH block,” and the like) including a synchronization signal (also referred to as an “SS,” “PSS and/or SSS,” or “NR-PSS and/or NR-SSS,” and the like) and a broadcast channel (also referred to as a "broadcast signal," "PBCH," or "NR-PBCH," and the like). A set of one or more signal blocks is also referred to as a "signal burst" ("SS/PBCH burst" or "SS burst"). A plurality of signal blocks in the signal burst are transmitted with different beams at different times (also referred to as "beam sweep" and the like).

The SS/PBCH block is constituted of one or more symbols (for example, OFDM symbols). Specifically, the SS/PBCH block may be constituted of a plurality of contiguous symbols. In the SS/PBCH block, each of a PSS, SSS, and NR-PBCH may be mapped in one or more different symbols. For example, for the SS/PBCH block, it is also studied to constitute the SS/PBCH block with four or five symbols including one symbol of the PSS, one symbol of the SSS, and two or three symbols of the PBCH.

The set of one or a plurality of SS/PBCH blocks may be also referred to as an "SS/PBCH burst." As for the SS/PBCH burst, frequency and/or time resources may be constituted of contiguous SS/PBCH blocks, or frequency and/or time resources may be constituted of non-contiguous SS/PBCH blocks. The SS/PBCH burst may be configured in a given periodicity (which may be also referred to as an "SS/PBCH burst periodicity") or may be configured non-periodically.

One or a plurality of SS/PBCH bursts may be also referred to as an "SS/PBCH burst set" ("SS/PBCH burst series"). The SS/PBCH burst set is configured periodically. The user terminal may assume that the SS/PBCH burst set is transmitted periodically (in SS/PBCH burst set periodicity (SS burst set periodicity)) and control a receiving process.

Figure 1A:
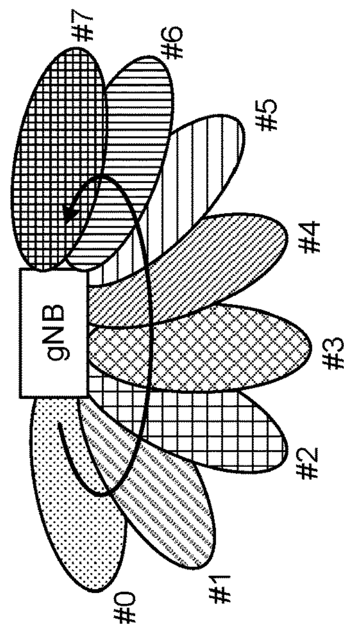
FIGS. 1A and 1B are diagrams to show an example of an SS burst set.
Figure 1B:
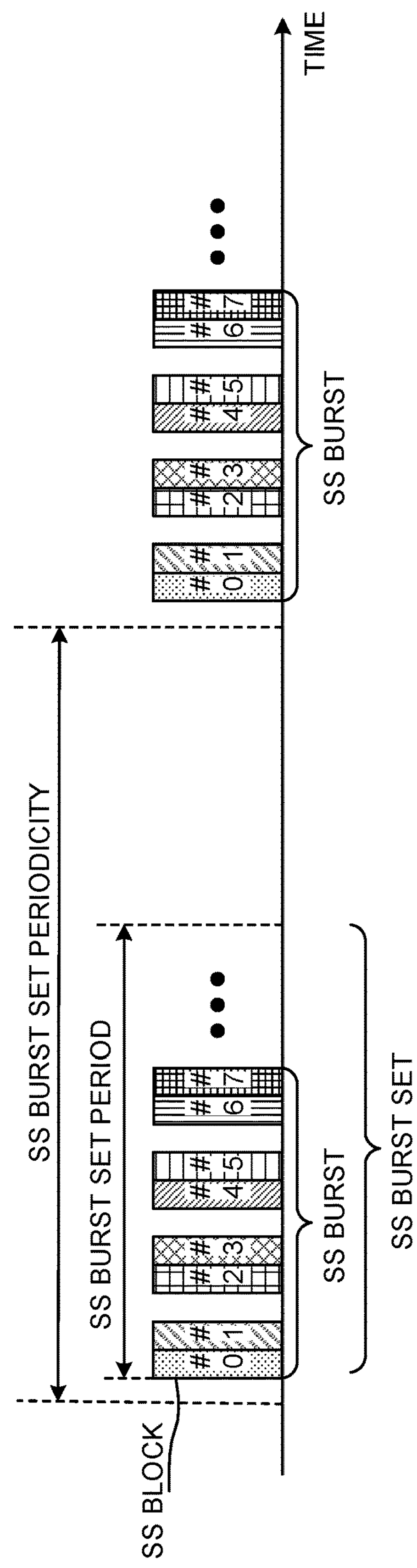

FIGS. 1A and 1B illustrate diagrams to show an example of an SS burst set. In FIG. 1A, an example of beam sweeping is shown. As shown in FIGS. 1A and 1B, a radio base station (for example, gNB) may make the directivity of beams be different in terms of time (beam sweeping) and transmit different SS blocks using different beams. Note that, in FIGS. 1A and 1B, an example using a multi-beam is shown, but SS blocks can be transmitted using a single beam.

As shown in FIG. 1B, an SS burst is constituted of one or more SS blocks, and an SS burst set is constituted of one or more SS bursts. For example, in FIG. 1B, an SS burst is constituted of eight SS blocks #0 to #7, but the SS burst is not limited to this. SS blocks #0 to #7 may be transmitted with different beams #0 to #7 (FIG. 1A), respectively.

As shown in FIG. 1B, the SS burst set including SS blocks #0 to #7 may be transmitted as not to exceed a given period (for example, which is equal to or less than 5 ms, also referred to as an "SS burst set period," and the like). The SS burst set may be repeated in a given periodicity (for example, for 5, 10, 20, 40, 80 or 160 ms, also referred to as "SS burst set periodicity" and the like).

Note that, in FIG. 1B, given time intervals are each provided between SS blocks #1 and #2, #3 and #4, #5 and #6, but the time intervals may not exist, or may be provided between other SS blocks (for example, between SS blocks #2 and #3, #5 and #6, and the like). In the time intervals, for example, a DL control channel (also referred to as a "PDCCH," "NR-PDCCH" or "downlink control information (DCI)," and the like) may be transmitted, and/or a UL control channel (PUCCH (Physical Uplink Control Channel)) may be transmitted from a user terminal. For example, if each SS block is constituted of four symbols, two symbols of the PDCCH, and two SS blocks, the PUCCH and guard time for 2 symbols may be included in a slot with 14 symbols.

An index (SS block index) of an SS block is signaled using a PBCH included in an SS block and/or DMRS (DeModulation Reference Signal) (PBCH DMRS) for a PBCH. The UE can grasp an SS block index of a received SS block, based on a PBCH (or PBCH DMRS).

An MIB (Master Information Block) in MSI (Minimum System Information) read at the time of an initial access by the UE is carried on a PBCH. The remaining MSI is RMSI (Remaining Minimum System Information) and is equivalent to SIB (System Information Block) 1 or SIB2 in LTE. RMSI is scheduled by a PDCCH indicated by an MIB.

As shown in FIG. 2, an example of MIB contents (information elements) and the payload size of each MIB content is studied.

For example, the MIB contents provided by a higher layer every 80 ms are SystemFrameNumber (6 MSBs of SystemFrameNumber), subCarrierSpacingCommon, Ssb-subcarrierOffset, Dmrs-TypeA-Position, pdcchConfigSIB1, cellBarred, intraFreqReselection, and spare. For example, the MIB contents generated based on a physical layer are 4 LSBs of SystemFrameNumber, Ssb-IndexExplicit, and Half-frame-index.

As for some MIB contents, interpretation is different depending on whether to use a first frequency band or a second frequency band, which is higher than the first frequency band. For example, the first frequency band may be a frequency band (sub-6) which is lower than 6 GHz, and the second frequency band may be a frequency band (above-6) which is higher than 6 GHz. The first frequency band may be also referred to as "FR (Frequency Range) 1." The second frequency band may be a frequency band which is higher than 24 GHz, and may be referred to as "FR2," "above-24," "millimeter wave," and the like.

SystemFrameNumber signals six most significant bits of the system frame number (SFN). subCarrierSpacingCommon signals subcarrier spacing (SCS, numerology) for RMSI reception. Ssb-subcarrierOffset signals a PRB (Physical Resource Block) grid offset for RMSI reception. Dmrs-TypeA-Position signals whether a symbol position of a DMRS for a PDSCH is the third symbol or the fourth symbol in a slot. pdcchConfigSIB1 signals a parameter set (PDCCH parameter set) of a PDCCH (or CORESET (Control Resource Set) including a PDCCH or RMSI CORESET) for RMSI reception. cellBarred signals whether or not this cell is incapable of camp on (serving) (Barred/notBarred). intraFreqReselection signals whether or not there is a cell which is capable of camp on within the same frequency (carrier band) (allowed/not allowed). spare is spare bits and may be used for a particular purpose.

4 LSBs of SystemFrameNumber signals four least significant bits of the SFN.

In above-6, Ssb-IndexExplicit signals three most significant bits of an SSB index. In sub-6, one bit in Ssb-IndexExplicit is shared by Ssb-subcarrierOffset.

If the maximum number of the SSB index is 64, six bits may be required. In above-6, the number of SSB indexes may be more than 8, and in sub-6, there is no cases where the number of SSB indexes is more than 8. In sub-6, particular one bit of Ssb-IndexExplicit is used with four bits of Ssb-subcarrierOffset to make Ssb-subcarrierOffset be five bits in total. Three least significant bits may be signaled implicitly using a DMRS for a PBCH.

Half-frame-index signals whether this SSB is a half frame for 5 ms of the first half of the radio frame (10 ms) or a half frame for 5 ms of the latter half. CRC is a code of a cyclic redundancy check generated based on the above-mentioned information.

For example, the whole PBCH is 56 bits including 24 bits for the higher layer, eight bits for the physical layer, and 24 bits of the CRC.

In this way, for each MIB content, the necessary number of bits and the number of code points are decided. For example, Ssb-subcarrierOffset represents an offset between a PRB (PRB for data) based on the center frequency of a carrier and a PRB of an SSB with the number of subcarriers. For example, if subcarrier spacings of an SSB and RMSI are the same, since one PRB is 12 subcarriers, Ssb-subcarrierOffset uses 12 code points (values from 0 to 11) in four bits.

However, in some MIB contents, bits and/or code points may remain. The code point is a value represented by a bit(s).

For example, in sub-6, one bit of Ssb-IndexExplicit is shared by Ssb-subcarrierOffset, and the other two bits remain.

For example, in above-6, Ssb-subcarrierOffset uses up to 12 code points (values from 0 to 11) among 16 code points of four bits, and hence at least four code points are not used (reserved). In sub-6, Ssb-subcarrierOffset uses up to 24 code points (values of 0 to 23) among 32 code points of five bits including one bit of Ssb-IndexExplicit, and hence at least eight code points are not used.

For example, in pdcchConfigSIB1, the number of PDCCH parameter sets supported is different depending on the combinations of an SCS of an SSB and subCarrierSpacingCommon.

Figure 3:
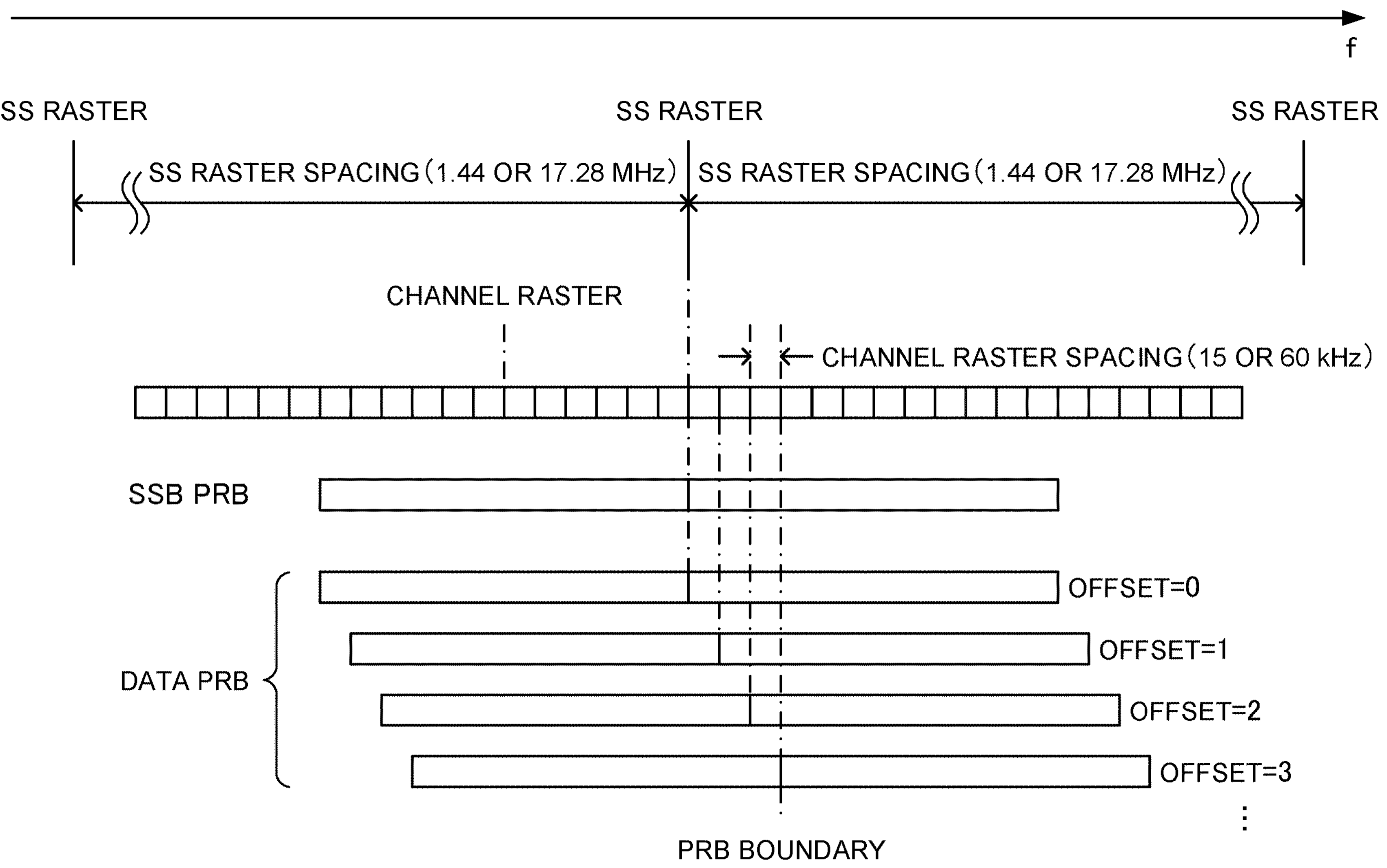
FIG. 3 is a diagram to show an example of Ssb-subcarrierOffset.

FIG. 3 is a diagram to show an example of Ssb-subcarrierOffset.

The frequency location where the center of a carrier can be located is referred to as a "channel raster." For example, in NR, the channel raster is located in spacing of the smallest SCS. PRBs for data (data PRBs) are located with channel rasters as PRB boundaries.

The frequency location in search of an SSB at the time of an initial access is referred to as an "SS (Synchronization Signal) raster" (or "synchronization raster" ("sync raster")). The frequency location of at least one SS raster is defined by a specification. PRBs for an SSB (SSB PRBs) are located with SS rasters as PRB boundaries. In a band of a carrier placed based on a channel raster, at least one SS raster is located.

For example, in the range of 2.4 GHz to 24.5 GHz, the channel raster spacing is 15 kHz, and the SS raster spacing is 1.44 MHz. For example, in the range of 24.25 GHz to 100 GHz, the channel raster spacing is 60 kHz, and the SS raster spacing is 17.28 MHz.

To reduce the number of times of search of an SSB by the UE, the SS raster spacing is larger than the channel raster spacing. When an SSB is located on the SS raster, data PRB boundary and SSB PRB boundary may not match.

If an SCS for an SSB (SSB SCS) is equal to an SCS for data (data SCS), the range of the shift of the data PRB boundary to the SSB PRB boundary is from 0 to 11 subcarriers. If the SSB SCS is different from the data SCS, and the data SCS is greater than the SSB SCS, the range of the shift of the data PRB boundary to the SSB PRB boundary is from 0 to 23 subcarriers. Ssb-subcarrierOffset represents this shift.

The UE searches for an SSB on an SS raster at the time of an initial access. The UE needs to read RMSI (or SIB) including information about a random access channel (RACH) to perform an initial access. Therefore, in an NR cell for standalone (SA), for the SSB for an initial access, RMSI associated with the SSB is transmitted.

On the other hand, for an SSB that is not used for an initial access, for example, an SSB of a cell (for example, an NR cell for non-standalone (NSA), a cell for NSA) that is used only for a secondary cell (SCell), RMSI associated with the SSB may not exist (not be transmitted). In an SSB in a cell for NSA, if cellBarred is "Barred," and all the cells in the carrier are cells for NSA, intraFreqReselection is "not allowed."

Figure 4:
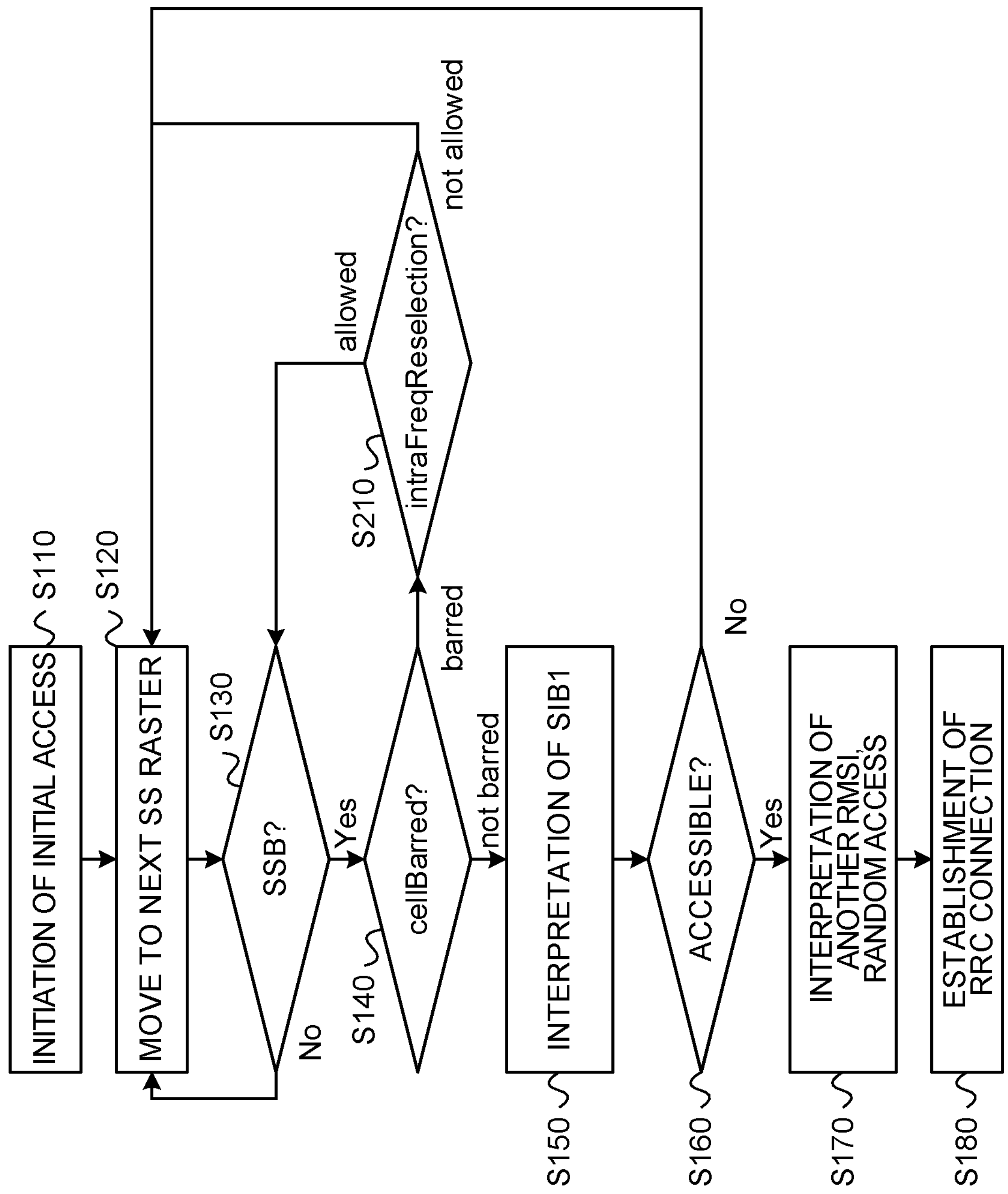
FIG. 4 is a flowchart to show an example of operations of an initial access.

Operations shown in FIG. 4 are considered as an example of operations of an initial access of the UE.

When the UE initiates an initial access (S110), the UE moves a frequency location to search for an SSB to a predefined next SS raster (S120). Then the UE determines whether or not an SSB is detected (S130).

If an SSB is not detected (S130: not detected), the UE proceeds the process to S120 (searches for an SSB in the next SS raster).

If an SSB is detected (S130: Yes), the UE determines whether or not cellBarred of a PBCH is "barred" (S140).

If cellBarred is "barred" (S140: barred), the UE determines whether or not intraFreqReselection of a PBCH is "allowed" (S210).

If intraFreqReselection is "allowed" (S210: allowed), the UE proceeds the process to S130 (confirms another SSB detected in the same carrier band).

If intraFreqReselection is "not allowed" (S210: not allowed), the UE proceeds the process to S120 (searches for an SSB in another carrier band).

If cellBarred is "not barred" (S140: not barred), the UE reads SIB1 in RMSI associated with the SSB (S150). Then the UE determines whether or not it is accessible to a cell (S160).

If it is inaccessible, for example, PLMN (Public Land Mobile Network)-ID is not available (S160: No), the UE proceeds the process to S120.

If it is accessible (S160: Yes), the UE reads other RMSI, performs a random access (S170), establishes an RRC connection (S180), and terminates this flow.

According to this operation, by sequentially searching a plurality of SS rasters predefined by a specification, the UE detects an accessible SSB and can perform a random access, based on RMSI associated with the SSB.

An SSB (carrier) to be found on an SS raster at the time of an initial access can be classified into cases 1 to 4 shown in FIG. 5.

Case 1: In an SSB of a certain cell, if cellBarred is "notBarred," intraFreqReselection is "allowed," RMSI associated with the SSB exists, and it is accessible to the cell, the UE accesses the cell (carrier).

Case 2: In an SSB of a certain cell, if cellBarred is "notBarred," intraFreqReselection is "allowed," RMSI associated with the SSB exists, and it is inaccessible to the cell, the UE searches the next SS raster. A case where it is inaccessible is, for example, a case where the PLMN-ID is not available PLMN-ID.

Case 3: In an SSB of a certain cell, if cellBarred is "Barred," intraFreqReselection is "not allowed," RMSI associated with the SSB does not exist, and it is inaccessible to the cell, the UE searches the next SS raster.

Case 4: In an SSB of a certain cell, if cellBarred is "Barred," intraFreqReselection is "not allowed," RMSI associated with the SSB (for Automatic Neighbor Relation (ANR)) exists, and it is inaccessible to the cell, the UE searches the next SS raster. In ANR, the base station receives information of neighboring cells from the UE and updates neighboring cell lists based on the information automatically. ANR is similar to a self-organizing network (SON). Even if the network to support ANR is a cell for NSA, the network transmits RMSI (SIB), and the UE supporting ANR reads the RMSI.

Even with a cell of "Barred" and "not allowed" like case 4, RMSI may be transmitted. Thus, it may be necessary to signal the UE that there is no RMSI associated with the received SSB. If there is no RMSI associated with the received SSB, it is not necessary to read RMSI even if the UE supports ANR.

Two following signaling methods are considered as signaling methods indicating that there is no RMSI associated with a received SSB.

Signaling method 1: Using one of code points which are not used among eight bits of pdcchConfigSIB1, to indicate that RMSI does not exist.

Signaling method 2: Using code points (values) of Ssb-subcarrierOffset which are not used (reserved), to indicate that RMSI does not exist. If RMSI does not exist, pdcchConfigSIB1 is used to signal the next SS raster (or synchronization raster (sync raster)) to search for an SSB that the UE defines the cell.

In a case of using signaling method 1, the UE cannot acquire information of an SS raster to search for an SSB next. On the other hand, in a case of using signaling method 2, if RMSI does not exist like case 3, the UE can acquire information of an SS raster to search for an SSB next by using pdcchConfigSIB1, but in a case of 2 or 4, the UE cannot acquire such information.

In above-6, if the maximum number of SSB indexes is 64, six bits are required, and three bits of Ssb-IndexExplicit are required. However, if the number of SSB indexes is less than 64, any bit of Ssb-IndexExplicit may not be used. For example, in above-6, if the number of SSB indexes is 8 (if the SSB indexes is #0 to #7), three bits of Ssb-IndexExplicit are always 0 and are not effectively used.

A frequency location of an SSB of a cell for NSA (SSB for NSA) is not searched by the UE in an initial access but is indicated by the network. This frequency location may be indicated by configuration of a measurement (for example, RRC information element measObject) through a higher layer. The frequency location of an SSB for NSA may be other than an SS raster. Thus, SSB PRB boundary of an SSB for NSA may match data PRB boundary. In this case, four bits of Ssb-subcarrierOffset are always 0 and are not effectively used.

In this way, a case that a bit and/or code point in a PBCH are not effectively used occurs.

Then the innovators of the present invention came up with the idea of achieving load reduction of the UE and/or improvement of detection performance of a PBCH by effectively using a bit and/or code point in a PBCH and increasing amount of information to signal by a limited PBCH.

Specifically, the interpretation of a specific information element (at least a part of MIB contents) in a PBCH is different depending on whether or not a specific condition is satisfied.

Embodiments according to the present invention will described in detail with reference to the drawings as follows. The radio communication methods according to the embodiments may be employed independently or may be employed in combination.

(First Aspect)

A specific condition in a first aspect is that, in an SSB found on an SS raster at the time of an initial access, cellBarred is "Barred," and intraFreqReselection is "not allowed."

The UE may recognize that, based on a received SSB, the SSB is an SSB for NSA. Because the received SSB indicates "Barred" and "not allowed," the SSB is an SSB of a cell for NSA (SSB for NSA). The SSB for NSA does not have to be located on an SS raster, but may be located on an SS raster. Because the UE performing an initial access searches for an SSB on an SS raster, the received SSB is located on an SS raster. Thus, even if the SSB is located on an SS raster, the SSB is not an SSB for an initial access. In this case, the UE searches an SS raster in another carrier band.

Because there is no reason to make SSB PRB boundary of an SSB for NSA be different from data PRB boundary, SSB PRB boundary of an SSB for NSA may match data PRB boundary. Thus, SSB PRB boundary of an SSB for NSA may match data PRB boundary, and the SSB for NSA may be located on an SS raster.

If SSB PRB boundary of an SSB for NSA matches data PRB boundary, and the received SSB is an SSB for NSA, the UE may assume that there is no shift between SSB PRB boundary and data PRB boundary. In this case, five bits of Ssb-subcarrierOffset including one bit of Ssb-IndexExplicit in sub-6 or four bits of Ssb-subcarrierOffset in above-6 may be used for another application.

If the received SSB is an SSB for NSA, RMSI CORESET associated with the SSB may not exist. If the received SSB is an SSB for NSA, and there is an RMSI CORESET for ANR associated with the SSB, the RMSI CORESET may be configured by a higher layer. Thus, if the received SSB is an SSB for NSA, the UE may assume that the SSB does not signal a configuration of the RMSI CORESET associated with the SSB. In this case, eight bits of pdcchConfigSIB1 may be used for another application.

An SCS for RMSI reception may be configured by a higher layer. Thus, if the received SSB is an SSB for NSA, the UE may assume that the SSB does not signal an SCS for RMSI reception. In this case, one bit of subCarrierSpacingCommon may be used for another application.

As described above, under the specific condition, at least a part of bits and/or code points (specific information elements) of Ssb-IndexExplicit, Ssb-subcarrierOffset, pdcchConfigSIB1, and subCarrierSpacingCommon may be used for another application.

Next, a method of interpreting a specific information element to another information element will be described.

Specific information elements may indicate information available to determine an SS raster location to search an SSB next. For example, the specific information elements may indicate an offset from a frequency location of a received SSB to a frequency location of an SSB for standalone (SA). For example, specific information elements may indicate an offset of an SS rasters (for example, an offset of an index of an SS raster) from an SS raster where a received SSB is located to an SS raster where an SSB for SA is located. The specific information elements may indicate a range or the number of SS rasters to skip from an SS raster where a received SSB is located to an SS raster to be searched by the UE in the next initial access. According to such specific information elements, the UE can know an SS raster to search next at the time of an initial access, and by skipping the search of unnecessary SS rasters, the UE can reduce initial access delay and/or power consumption. Information available to determine an SS raster location to search an SSB next as above may be transmitted while being included in RMSI (for example, SIB1). Since there is RMSI associated with an SSB in case 2 and case 4, the UE can read SIB1, and can acquire information available to reduce initial access delay and/or power consumption.

The UE may search for all SSBs for SA in SS rasters or may search until the UE detects one SSB for SA.

Specific information elements may indicate at least a part of country code (Mobile Country Code (MCC)), network number (Mobile Network Code (MNC)), and PLMN-ID. At the time of roaming, and the like, the UE can know a country and/or a network, and can narrow at least one of an operator, a band, an SS raster of a search target, based on information obtained from a country and/or a network, SIM (Subscriber Identity Module), and the like. Thus, the UE can reduce the delay of an initial access.

Different signaling methods and UE operations may be employed in case 3 (in the absence of RMSI for ANR) and case 4 (in the presence of RMSI for ANR). In other words, one bit of Ssb-subcarrierOffset or one bit of spare (spare bits) may be the specific information element and may indicate case 3 or case 4 (case information). Alternatively, one bit of Ssb-subcarrierOffset or one bit of spare (spare bits) may be the specific information element and may indicate whether or not the UE reads SIB1 even if cellBarred is “Barred” (in other words, whether or not information useful for an initial access is included in SIB1). Alternatively, one bit of Ssb-subcarrierOffset or one bit of spare (spare bits) may be the specific information element and may indicate whether or not another specific information element is included in another bit (information element) in a PBCH (in other words, whether the UE interprets an information element to another information element).

In case 3, the rest of bits of the case information of Ssb-subcarrierOffset, pdcchConfigSIB1, and subCarrierSpacingCommon may be the specific information elements, and may indicate a frequency location of an SS raster to search next, a range of an SS raster which can skip, and the like, and may indicate at least a part of MCC, MNC, and PLMN-ID.

In case 4, SIB1 in RMSI associated with the SSB may indicate a frequency location of an SS raster to search next, a range of an SS raster which can skip, and the like.

Figure 6:
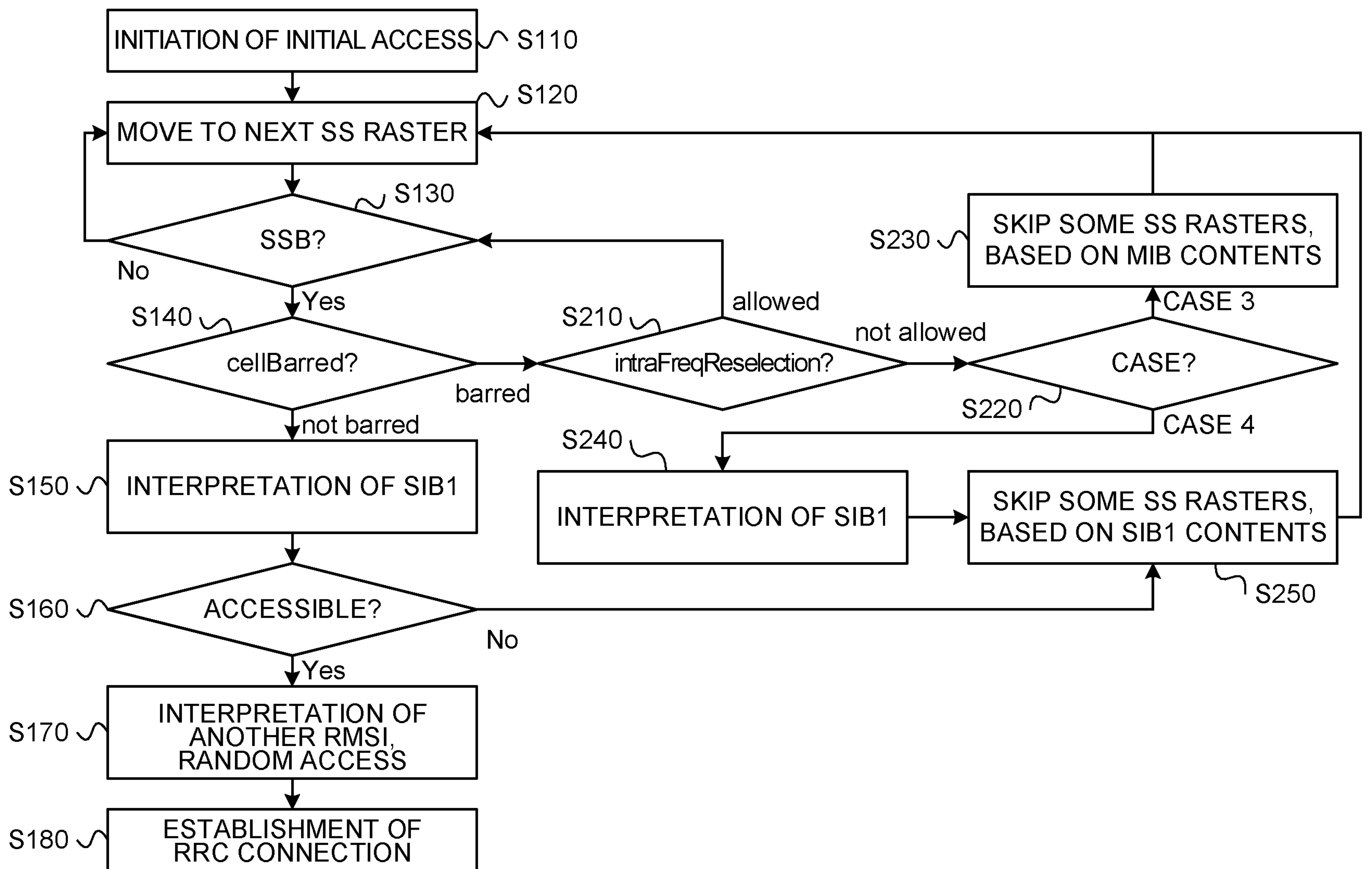
FIG. 6 is a flowchart to show an example of operations of an initial access according to a first aspect.

FIG. 6 is a flowchart to show an example of operations of an initial access according to a first aspect.

When the UE initiates an initial access (S110), the UE moves a frequency location to search for an SSB to a predefined next SS raster (S120). Then the UE determines whether or not an SSB is detected (S130).

If an SSB is not detected (S130: No), the UE proceeds the process to S120 (searches for an SSB in the next SS raster).

If an SSB is detected (S130: Yes), the UE determines whether or not cellBarred of a PBCH is “barred” (S140).

If cellBarred is “barred” (S140: barred), the UE determines whether or not intraFreqReselection of a PBCH is “allowed” (S210).

If intraFreqReselection is “allowed” (S210: allowed), the UE proceeds the process to S130.

If intraFreqReselection is “not allowed” (S210: not allowed), the UE determines whether or not it is case 4 (there is RMSI associated with the SSB) (S220).

If it is case 3 (S220: case 3), the UE skips some SS rasters based on MIB contents (S230), and proceeds the process to S120 (searches for an SSB in another carrier band).

If it is case 4 (S220: case 4), the UE reads SIB1 in RMSI associated with the SSB (S240). SIB1 may indicate a frequency location of an SS raster to search next (or a range of an SS raster which can skip, and the like). Then the UE skips some SS rasters, based on SIB1 contents (S250), and proceeds the process to S120 (searches for an SSB in another carrier band).

If cellBarred is “not barred” (S140: not barred), the UE reads SIB1 in RMSI associated with the SSB (S150). Then the UE determines whether or not it is accessible to a cell (S160).

If it is inaccessible, for example, PLMN-ID is not available (S160: No, case 2), the UE proceeds the process to S250.

If it is accessible (S160: Yes, case 1), the UE reads other RMSI, performs a random access (S170), establishes an RRC connection (S180), and terminates this flow.

According to this operation, because information about an SS raster to search next can be signaled not only in case 3 but also in case 2 and case 4, the UE can reduce initial access delay.

In a case of using above-mentioned signaling method 2, if RMSI does not exist (case 3), it is considered to signal a frequency location of an SS raster to search next. However, signaling method 2 cannot signal a frequency location of an SS raster to search next in case 2 and case 4. Because there is RMSI associated with the SSB in case 2 and case 4, bits of pdcchConfigSIB1 cannot be used for another application.

(Second Aspect)

A specific condition in a second aspect is that a connected (CONNECTED mode) UE is indicated for a measurement of an SSB in a frequency location except an SS raster. For example, a frequency location of an SSB of a measurement target is indicated through a higher layer (for example, information element measurement object (measObject) of RRC signaling).

Because an SSB of a measurement target is not located on an SS raster, the UE may assume that the SSB is an SSB for NSA.

Like the first aspect, if SSB PRB boundary of an SSB for NSA matches data PRB boundary, and the received SSB is an SSB for NSA, the UE may assume that there is no shift between SSB PRB boundary and data PRB boundary. In this case, five bits of Ssb-subcarrierOffset including one bit of Ssb-IndexExplicit in sub-6 or four bits of Ssb-subcarrierOffset in above-6 may be used for another application.

Like the first aspect, if the received SSB is an SSB for NSA, RMSI CORESET associated with the SSB does not need to exist. If the received SSB is an SSB for NSA, and there is an RMSI CORESET for ANR associated with the SSB, the RMSI CORESET may be configured by a higher layer. Thus, if the received SSB is an SSB for NSA, the UE may assume that the SSB does not signal a configuration of the RMSI CORESET associated with the SSB. In this case, eight bits of pdcchConfigSIB1 may be used for another application.

Like the first aspect, an SCS for RMSI reception may be configured by a higher layer. Thus, if the received SSB is an SSB for NSA, the UE may assume that the SSB does not signal an SCS for RMSI reception. In this case, one bit of subCarrierSpacingCommon may be used for another application.

If an SSB of a measurement target is not located on an SS raster, the UE may assume “Barred” and “not allowed.” In this case, cellBarred and intraFreqReselection may be used for another application.

As described above, under the specific condition, at least a part of bits and/or code points (specific information elements) of Ssb-IndexExplicit, Ssb-subcarrierOffset, pdcchConfigSIB1, subCarrierSpacingCommon, cellBarred, and intraFreqReselection may be used for another application.

Next, a method of interpreting a specific information element to another information element will be described.

The specific information element may indicate information to be read by the connected UE from a PBCH, and may indicate information which may be different for each cell.

The specific information element may indicate timing related information indicating time resources of an SSB and/or DMRS. The timing related information may indicate at least a part of SystemFrameNumber, Half-frame-index, SSB index (implicit signaling and/or explicit signaling (Ssb-IndexExplicit)), Dmrs-TypeA-Position.

Because timings may not match between carriers, it is preferable for the UE to read timing related information from a PBCH in a carrier for which measurement is indicated. Since timing related information may be different for each cell, signaling timing related information for each cell by a higher layer increases overhead. Thus, timing related information is not interpreted to another information (not used for another application).

In addition to an information element of timing related information, timing related information may be signaled using the specific information element. For example, in addition to an information element of timing related information, timing related information may be transmitted repeatedly by using the specific information element. According to this repetition transmission, a detection ratio of timing related information can be improved.

The specific information element may indicate a fixed value defined in advance by a specification. A detection ratio can be improved by the UE assuming the specific information element to be a fixed value and decoding a PBCH. For example, the UE may decode timing related information by using a fixed value as a reference (known value).

Timing related information may be encoded, and the encoded information may be signaled by using an information element of timing related information and the specific information element. For example, the specific information element may be a redundant code for timing related information. If the specific information element is used for repetition transmission of timing related information, a fixed value, or encoded information, the specific information element may be information used for decoding of the timing related information.

The specific information element may indicate measurement related information about measurement of an SSB. The measurement related information may indicate a frequency location of another SSB. For example, a frequency location of an SSB of a measuring target may be indicated by a higher layer, and the specific information element of the SSB may indicate a frequency location of another SSB. The UE may measure an SSB indicated by a higher layer and an SSB indicated by the measurement related information. For example, if the UE supports broadband, and a plurality of SSBs are located at different frequency locations in the band, measuring time can be reduced in comparison with a case where a plurality of SSBs are located in different time positions.

The measurement related information may include an actual transmission periodicity of an SSB for each cell. For example, this transmission periodicity may be an SS burst set periodicity. An SSB measurement timing configuration (SS block based RRM measurement timing configuration (SMTC)) signaled by a higher layer (for example, measurement object of RRC signaling) includes a measurement periodicity of an SSB. An SMTC may be signaled to an idle UE by an SIB.

For example, if the UE receiving many receive beams measures an SSB by switching receive beams every measurement periodicity, measurement requires many measurement periodicities, and thus the measurement takes time. If an SS burst set periodicity is shorter than a measurement periodicity of an SMTC, an SSB may signal an SS burst set periodicity, and the UE may measure an SSB by switching the receive beams every SS burst set periodicity. In this case, time required for measurement can shorten in comparison with a case of using measurement periodicities.

The specific information element may indicate quasi co-location (QCL) related information about QCL between SSBs. If major property of a channel carrying a certain SSB can be inferred from a channel carrying another SSB, those SSBs are QCL. For example, the major property includes at least one of delay spread, Doppler spread, Doppler shift, an average gain, average latency, and a spatial reception parameter. For example, the spatial reception parameter is a beam (for example, a transmit beam).

For example, QCL related information in a certain SSB may include an SSB index of an SSB which is in the QCL relationship (quasi co-located) with the SSB. For example, a plurality of QCL patterns indicating SSB indexes which are in the QCL relationship may be defined by a specification or may be configured by a higher layer. In this case, the QCL related information may include an index of a QCL pattern.

Suppose up to 64 SSBs can be transmitted in one SS burst set, all SSBs are not QCL, and all SSBs are transmitted by using different base station beams (transmit beams). The UE can measure only one SSB for one base station beam in one SS burst set, which takes long measuring time.

If a plurality of SSBs are transmitted by using the same base station beam, and the QCL related information of the plurality of SSBs is signaled by the UE, the UE may apply different receive beams for the plurality of SSBs, or can measure the plurality of SSBs for one base station beam in one SS burst set. Therefore, measurement delay can be reduced or accuracy of measurement can be improved.

The measurement related information and/or QCL related information may be signaled by a higher layer. However, since the measurement related information and/or the QCL related information may be different for each cell, if the measurement related information and/or the QCL related information for each cell is signaled by a higher layer, overhead is large.

(Third Aspect)

A specific condition in a third aspect is that the connected UE is instructed for measurement of an SSB and a specific parameter configured by a higher layer is a measured value.

The specific parameter may be a bit map to indicate whether or not each SSB is a measurement target. This bit map includes bits corresponding to all SSB indexes. Each bit indicates that the corresponding SSB is transmitted when the bit is 1, and indicates that the corresponding SSB is not transmitted when the bit is 0. If all the bits subsequent to a particular position of the bit map are 0, a part or all of Ssb-IndexExplicit is 0, and hence it may be used for another application.

For example, in above-6, the number of SSB indexes is up to 64. In bits #0 to #63 in the bit map, if all of bits #32 to #63 are 0, an SSB index of an SSB to be searched for by the UE can be narrowed down to #0 to #31, and one bit of Ssb-IndexExplicit may be used for another application.

As described above, under the specific condition, at least a part of bits and/or code points (specific information elements) of Ssb-IndexExplicit may be used for another application.

Next, a method of interpreting a specific information element to another information element will be described.

Like the second aspect, the specific information element may indicate at least one of timing related information, measurement related information, and QCL related information. Like the second aspect, the specific information element may be used for repetition of timing related information, coding of timing related information, and a fixed value.

(Fourth Aspect)

A specific condition in a fourth aspect may be that the connected UE is indicated for measurement of an SSB in a specific frequency band. For example, the specific frequency band may be FR2.

If the received SSB is located outside an SS raster, four bits of Ssb-subcarrierOffset may be used for another application.

If the received SSB is located on an SS raster, since Ssb-subcarrierOffset may be used, one bit or two bits of spare (spare bits) may be used for another application.

As described above, under the specific condition, at least a part of bits and/or code points (specific information elements) of Ssb-subcarrierOffset and spare may be used for another application.

Next, a method of interpreting a specific information element to another information element will be described.

The specific information element may indicate QCL related information.

For example, in FR2, if the UE performs receive beam forming by using analog beam foaming (BF), only one receive beam is used for one measurement, and hence measurement is performed for time corresponding to the measurement periodicity*the number of receive beams. Thus, measurement delay is concerned.

In this case, the specific information element may signal QCL related information indicating a plurality of SSBs in the same SS burst set are transmitted by using the same base station beam. According to this QCL related information, measurement delay can be reduced.

(Other Aspects)

Among information elements in a PBCH, even information that can be signaled by a higher layer is preferably signaled by a PBCH in some cases.

For example, a parameter which may be different for each cell is preferably signaled by a PBCH since overhead increases in case of signaling by a higher layer for each cell of a measurement target.

For example, if a measurement instruction of an SSB of an NR carrier is performed from a network of LTE, to signal parameters of a cell of NR to the UE in connection with LTE by a higher layer, it is necessary to signal many parameters that a gNB of NR has to an eNB of LTE. Thus, it is preferable to signal of parameters of a measurement on a PBCH rather than signaling parameters of a measurement by a higher layer. That is, parameters configured by a secondary network (SN) of NR does not need to be shared by a master network (MN) of LTE.

A plurality of aspects mentioned above may be combined. For example, different specific information elements may be used depending on whether or not a received SSB is located in an SS raster. For example, different specific information elements may be used depending on whether or not the UE performs an initial access. For example, different specific information elements may be used depending on whether or not the UE is connected. For example, different specific information elements may be used depending on whether or not there is RMSI associated with the received SSB.

(Radio Communication System)

Hereinafter, a structure of a radio communication system according to one embodiment of the present invention will be described. In this radio communication system, the radio communication method according to each embodiment of the present invention described above may be used alone or may be used in combination for communication.

Figure 7:
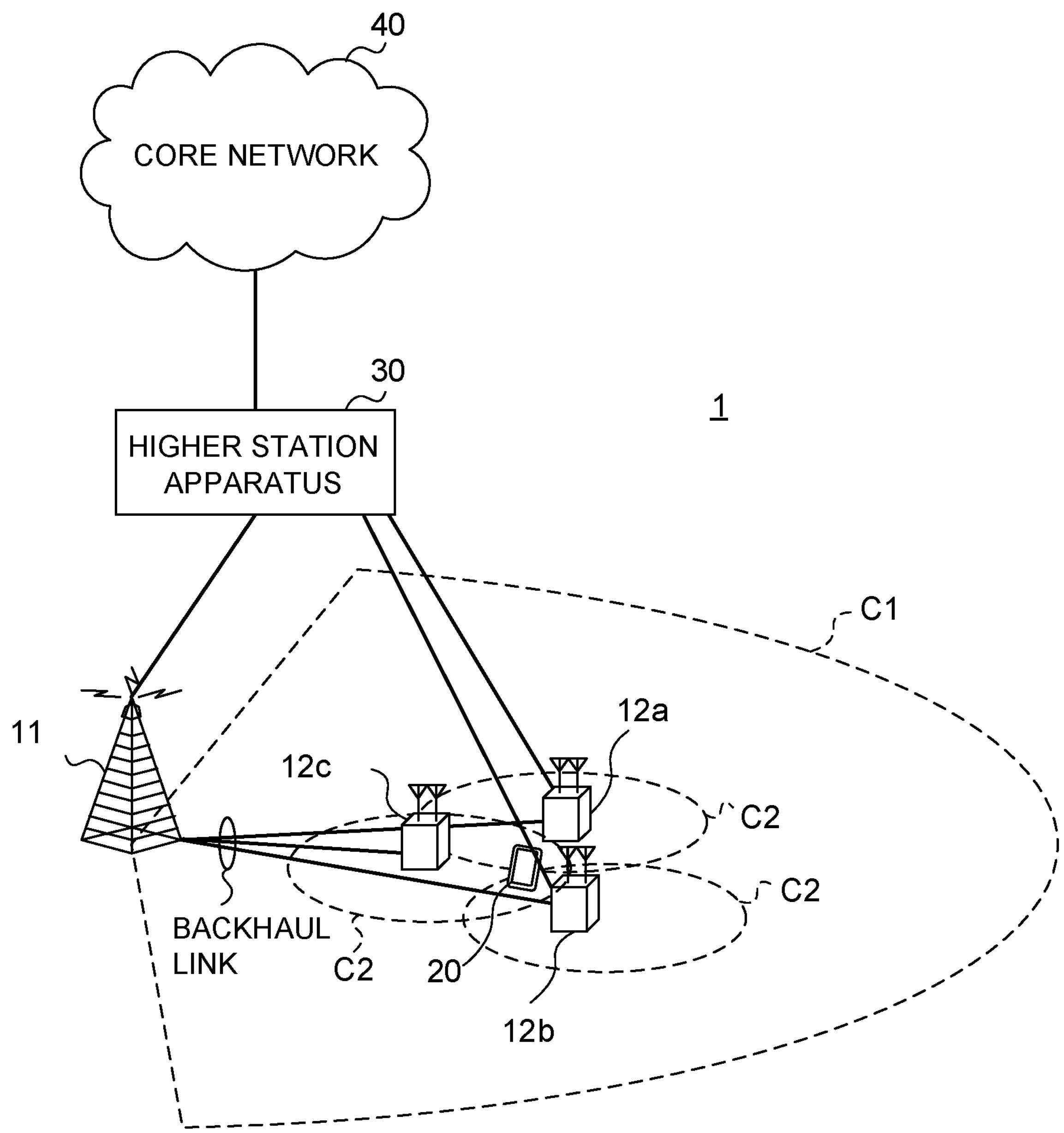
FIG. 7 is a diagram to show an example of a schematic structure of a radio communication system according to one embodiment of the present invention.

FIG. 7 is a diagram to show an example of a schematic structure of the radio communication system according to one embodiment of the present invention. A radio communication system 1 can adopt carrier aggregation (CA) and/or dual connectivity (DC) to group a plurality of fundamental frequency blocks (component carriers) into one, where the system bandwidth in LTE systems (for example, 20 MHz) constitutes one unit.

Note that the radio communication system 1 may be referred to as "LTE (Long Term Evolution)," "LTE-A (LTE-Advanced)," "LTE-B (LTE-Beyond)," "SUPER 3G," "IMT-Advanced," "4G (4th generation mobile communication system)," "5G (5th generation mobile communication system)," "NR (New Radio)," "FRA (Future Radio Access)," "New-RAT (Radio Access Technology)," and so on, or may be referred to as a system implementing these.

The radio communication system 1 includes a radio base station 11 that forms a macro cell C1 of a relatively wide coverage, and radio base stations 12 (12*a* to 12*c*) that form small cells C2, which are placed within the macro cell C1 and which are narrower than the macro cell C1. Also, user terminals 20 are placed in the macro cell C1 and in each small cell C2. The arrangement, the number, and the like of each cell and user terminal 20 are by no means limited to that shown in the diagram.

The user terminals 20 can connect with both the radio base station 11 and the radio base stations 12. It is assumed that the user terminals 20 use the macro cell C1 and the small cells C2 at the same time by CA or DC. The user terminals 20 can execute CA or DC by using a plurality of cells (CCs) (for example, 5 CCs or less, 6 CCs or more).

Between the user terminals 20 and the radio base station 11, communication can be carried out by using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz, and so on) and a wide bandwidth may be used, or the same carrier as that used between the user terminals 20 and the radio base station 11 may be used. Note that the structure of the frequency band for use in each radio base station is by no means limited to these.

A structure may be employed in which wired connection (for example, an optical fiber in compliance with the CPRI (Common Public Radio Interface), an X2 interface, and so on) or wireless connection is established between the radio base station 11 and the radio base stations 12 (or between two radio base stations 12).

The radio base station 11 and the radio base stations 12 are each connected with a higher station apparatus 30, and are connected with a core network 40 via the higher station apparatus 30. Note that the higher station apparatus 30 may be, for example, access gateway apparatus, a radio network controller (RNC), a mobility management entity (MME), and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. The radio base stations 12 are radio base stations having local coverages, and may be referred to as "small base stations," "micro base stations," "pico base stations," "femto base stations,"

"HeNBs (Home eNodeBs)," "RRHs (Remote Radio Heads)," "transmitting/receiving points" and so on. Hereinafter, the radio base stations 11 and 12 will be collectively referred to as "radio base stations 10," unless specified otherwise.

Each of the user terminals 20 is a terminal that supports various communication schemes such as LTE and LTE-A, and may include not only mobile communication terminals (mobile stations) but stationary communication terminals (fixed stations).

In the radio communication system 1, as radio access schemes, orthogonal frequency division multiple access (OFDMA) is applied to the downlink, and single carrier frequency division multiple access (SC-FDMA) and/or OFDMA is applied to the uplink.

OFDMA is a multi-carrier communication scheme to perform communication by dividing a frequency band into a plurality of narrow frequency bands (subcarriers) and mapping data to each subcarrier. SC-FDMA is a single carrier communication scheme to mitigate interference between terminals by dividing the system bandwidth into bands including one or continuous resource blocks per terminal, and allowing a plurality of terminals to use mutually different bands. Note that the uplink and downlink radio access schemes are by no means limited to the combinations of these, and other radio access schemes may be used.

In the radio communication system 1, a downlink shared channel (PDSCH (Physical Downlink Shared Channel), which is used by each user terminal 20 on a shared basis, a broadcast channel (PBCH (Physical Broadcast Channel)), downlink L1/L2 control channels and so on, are used as downlink channels. User data, higher layer control information, SIBs (System Information Blocks) and so on are communicated on the PDSCH. The MIBs (Master Information Blocks) are communicated on the PBCH.

The downlink L1/L2 control channels include a PDCCH (Physical Downlink Control Channel), an EPDCCH (Enhanced Physical Downlink Control Channel), a PCFICH (Physical Control Format Indicator Channel), a PHICH (Physical Hybrid-ARQ Indicator Channel) and so on. Downlink control information (DCI), including PDSCH and/or PUSCH scheduling information, and so on are communicated on the PDCCH.

Note that the scheduling information may be signaled by the DCI. For example, the DCI scheduling DL data reception may be referred to as "DL assignment," and the DCI scheduling UL data transmission may be referred to as "UL grant."

The number of OFDM symbols to use for the PDCCH is communicated on the PCFICH. Transmission confirmation information (for example, also referred to as "retransmission control information," "HARQ-ACK," "ACK/NACK," and so on) of HARQ (Hybrid Automatic Repeat reQuest) to a PUSCH is transmitted on the PHICH. The EPDCCH is frequency-division multiplexed with the PDSCH (downlink shared data channel) and used to communicate DCI and so on, like the PDCCH.

In the radio communication system 1, an uplink shared channel (PUSCH (Physical Uplink Shared Channel)), which is used by each user terminal 20 on a shared basis, an uplink control channel (PUCCH (Physical Uplink Control Channel)), a random access channel (PRACH (Physical Random Access Channel)) and so on are used as uplink channels. User data, higher layer control information and so on are communicated on the PUSCH. In addition, radio quality information (CQI (Channel Quality Indicator)) of the downlink, transmission confirmation information, SR (Scheduling Request), and so on are transmitted on the PUCCH. By means of the PRACH, random access preambles for establishing connections with cells are communicated.

In the radio communication system 1, a cell-specific reference signal (CRS), a channel state information-reference signal (CSI-RS), a demodulation reference signal (DMRS), a positioning reference signal (PRS), and so on are transmitted as downlink reference signals. In the radio communication system 1, a measurement reference signal (SRS (Sounding Reference Signal)), a demodulation reference signal (DMRS), and so on are transmitted as uplink reference signals. Note that DMRS may be referred to as a "user terminal specific reference signal (UE-specific Reference Signal)." Transmitted reference signals are by no means limited to these.

<Radio Base Station>

Figure 8:
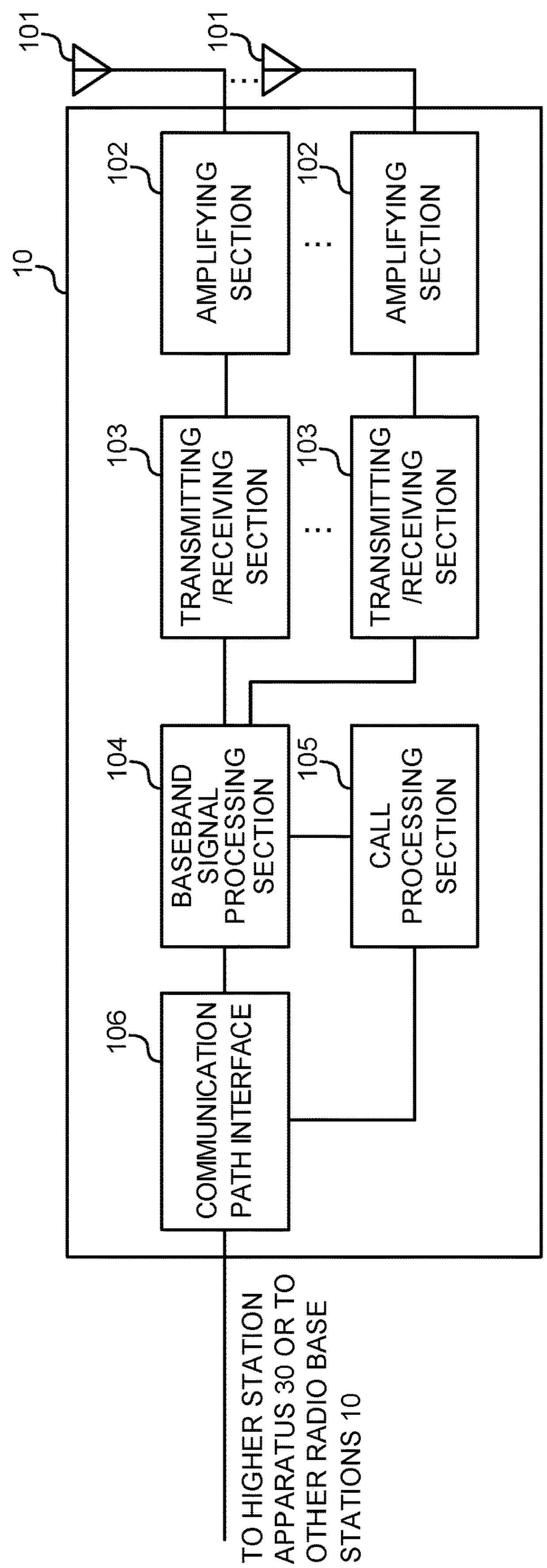
FIG. 8 is a diagram to show an example of an overall structure of a radio base station according to one embodiment of the present invention.

FIG. 8 is a diagram to show an example of an overall structure of the radio base station according to one embodiment of the present invention. A radio base station 10 includes a plurality of transmitting/receiving antennas 101, amplifying sections 102, transmitting/receiving sections 103, a baseband signal processing section 104, a call processing section 105 and a communication path interface 106. Note that the radio base station 10 may be configured to include one or more transmitting/receiving antennas 101, one or more amplifying sections 102 and one or more transmitting/receiving sections 103.

User data to be transmitted from the radio base station 10 to the user terminal 20 by the downlink is input from the higher station apparatus 30 to the baseband signal processing section 104, via the communication path interface 106.

In the baseband signal processing section 104, the user data is subjected to transmission processes, such as a PDCP (Packet Data Convergence Protocol) layer process, division and coupling of the user data, RLC (Radio Link Control) layer transmission processes such as RLC retransmission control, MAC (Medium Access Control) retransmission control (for example, an HARQ transmission process), scheduling, transport format selection, channel coding, an inverse fast Fourier transform (IFFT) process, and a precoding process, and the result is forwarded to each transmitting/receiving section 103. Furthermore, downlink control signals are also subjected to transmission processes such as channel coding and inverse fast Fourier transform, and the result is forwarded to each transmitting/receiving section 103.

The transmitting/receiving sections 103 convert baseband signals that are pre-coded and output from the baseband signal processing section 104 on a per antenna basis, to have radio frequency bands and transmit the result. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted with transmitters/receivers, transmitting/receiving circuits or transmitting/receiving apparatus that can be described based on general understanding of the technical field to which the present invention pertains. Note that each transmitting/receiving section 103 may be structured as a transmitting/receiving section in one entity, or may be constituted with a transmitting section and a receiving section.

Meanwhile, as for uplink signals, radio frequency signals that are received in the transmitting/receiving antennas 101 are amplified in the amplifying sections 102. The transmitting/receiving sections 103 receive the uplink signals amplified in the amplifying sections 102. The transmitting/receiving sections 103 convert the received signals into the baseband signal through frequency conversion and outputs to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, an MAC retransmission control receiving process, and RLC layer and PDCP layer receiving processes, and forwarded to the higher station apparatus 30 via the communication path interface 106. The call processing section 105 performs call processing (setting up, releasing and so on) for communication channels, manages the state of the radio base station 10 and manages the radio resources.

The communication path interface 106 transmits and/or receives signals to and/or from the higher station apparatus 30 via a given interface. The communication path interface 106 may transmit and/or receive signals (backhaul signaling) with other radio base stations 10 via an inter-base station interface (for example, an optical fiber in compliance with the CPRI (Common Public Radio Interface) and an X2 interface).

The transmitting/receiving sections 103 may transmit a synchronization signal block (for example, SSB, SS/PBCH block) including a broadcast channel (for example, PBCH).

Figure 9:
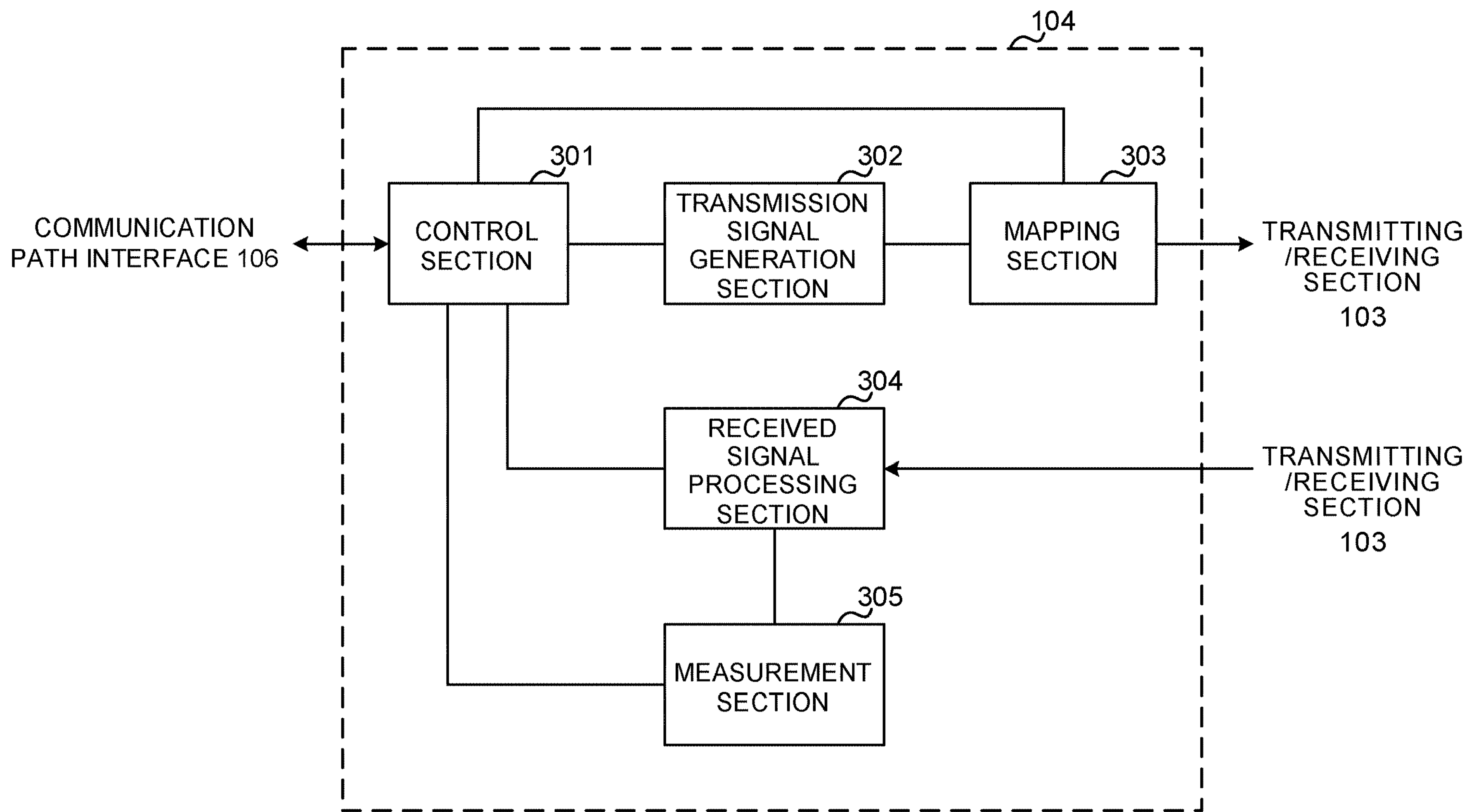
FIG. 9 is a diagram to show an example of a functional structure of the radio base station according to one embodiment of the present invention.

FIG. 9 is a diagram to show an example of a functional structure of the radio base station according to one embodiment of the present invention. Note that, the present example primarily shows functional blocks that pertain to characteristic parts of the present embodiment, and it is assumed that the radio base station 10 may include other functional blocks that are necessary for radio communication as well.

The baseband signal processing section 104 at least includes a control section (scheduler) 301, a transmission signal generation section 302, a mapping section 303, a received signal processing section 304, and a measurement section 305. Note that these structures may be included in the radio base station 10, and some or all of the structures do not need to be included in the baseband signal processing section 104.

The control section (scheduler) 301 controls the whole of the radio base station 10. The control section 301 can be constituted with a controller, a control circuit or control apparatus that can be described based on general understanding of the technical field to which the present invention pertains.

The control section 301, for example, controls the generation of signals by the transmission signal generation section 302, the mapping of signals by the mapping section 303, and so on. The control section 301 controls the signal receiving processes by the received signal processing section 304, the measurements of signals by the measurement section 305, and so on.

The control section 301 controls the scheduling (for example, resource assignment) of system information, a downlink data signal (for example, a signal transmitted on the PDSCH), a downlink control signal (for example, a signal transmitted on the PDCCH and/or the EPDCCH. Transmission confirmation information, and so on). Based on the results of determining necessity or not of retransmission control to the uplink data signal, or the like, the control section 301 controls generation of a downlink control signal, a downlink data signal, and so on. The control section 301 controls the scheduling of a synchronization signal (for example, PSS (Primary Synchronization Signal)/SSS (Secondary Synchronization Signal)), a downlink reference signal (for example, CRS, CSI-RS, DMRS), and so on.

The control section 301 controls the scheduling of an uplink data signal (for example, a signal transmitted on the PUSCH), an uplink control signal (for example, a signal transmitted on the PUCCH and/or the PUSCH. Transmission confirmation information, and so on), a random access preamble (for example, a signal transmitted on the PRACH), an uplink reference signal, and so on.

The transmission signal generation section 302 generates downlink signals (downlink control signals, downlink data signals, downlink reference signals and so on) based on commands from the control section 301 and outputs the downlink signals to the mapping section 303. The transmission signal generation section 302 can be constituted with a signal generator, a signal generation circuit or signal generation apparatus that can be described based on general understanding of the technical field to which the present invention pertains.

For example, the transmission signal generation section 302 generates DL assignment to signal assignment information of downlink data and/or UL grant to signal assignment information of uplink data, based on commands from the control section 301. The DL assignment and the UL grant are both DCI, and follows the DCI format. For a downlink data signal, encoding processing and modulation processing are performed in accordance with a coding rate, modulation scheme, or the like determined based on channel state information (CSI) from each user terminal 20.

The mapping section 303 maps the downlink signals generated in the transmission signal generation section 302 to given radio resources, based on commands from the control section 301, and outputs these to the transmitting/receiving sections 103. The mapping section 303 can be constituted with a mapper, a mapping circuit or mapping apparatus that can be described based on general understanding of the technical field to which the present invention pertains.

The received signal processing section 304 performs receiving processes (for example, demapping, demodulation, decoding and so on) of received signals that are input from the transmitting/receiving sections 103. Here, the received signals are, for example, uplink signals that are transmitted from the user terminals 20 (uplink control signals, uplink data signals, uplink reference signals and so on). The received signal processing section 304 can be constituted with a signal processor, a signal processing circuit or signal processing apparatus that can be described based on general understanding of the technical field to which the present invention pertains.

The received signal processing section 304 outputs the decoded information acquired through the receiving processes to the control section 301. For example, if the received signal processing section 304 receives the PUCCH including HARQ-ACK, the received signal processing section 304 outputs the HARQ-ACK to the control section 301. The received signal processing section 304 outputs the received signals and/or the signals after the receiving processes to the measurement section 305.

The measurement section 305 conducts measurements with respect to the received signals. The measurement section 305 can be constituted with a measurer, a measurement circuit or measurement apparatus that can be described based on general understanding of the technical field to which the present invention pertains.

For example, the measurement section 305 may perform RRM (Radio Resource Management) measurement, CSI (Channel State Information) measurement, and so on, based on the received signal. The measurement section 305 may measure a received power (for example, RSRP (Reference Signal Received Power)), a received quality (for example, RSRQ (Reference Signal Received Quality), an SINR (Signal to Interference plus Noise Ratio), a signal strength (for example, RSSI (Received Signal Strength Indicator)), channel information (for example, CSI), and so on. The measurement results may be output to the control section 301.

The control section 301 may interpret (read) a specific information element in the broadcast channel as a different information element depending on whether or not a specific condition is satisfied.

<User Terminal>

Figure 10:
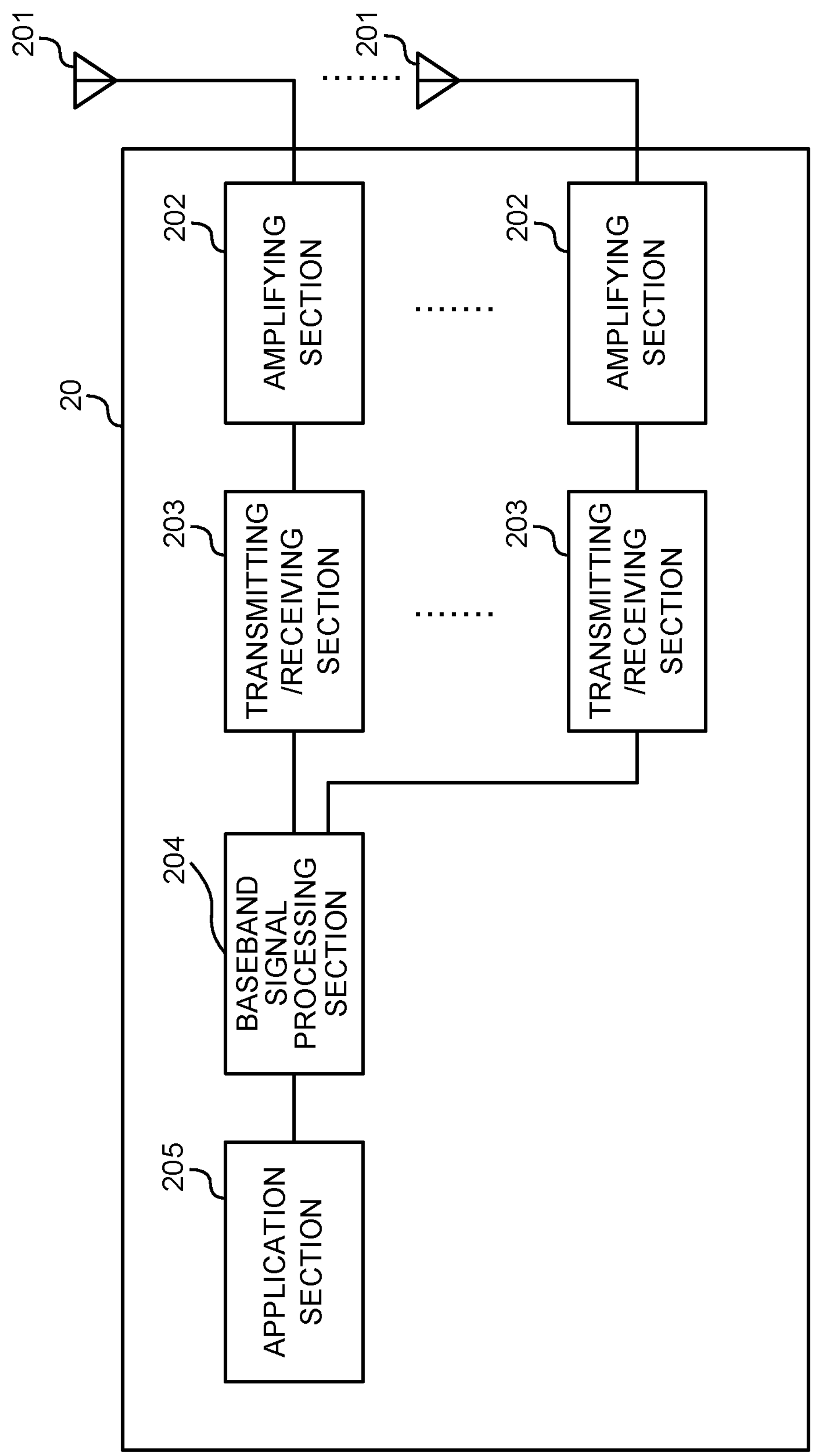
FIG. 10 is a diagram to show an example of an overall structure of a user terminal according to one embodiment of the present invention.

FIG. 10 is a diagram to show an example of an overall structure of a user terminal according to one embodiment of the present invention. A user terminal 20 includes a plurality of transmitting/receiving antennas 201, amplifying sections 202, transmitting/receiving sections 203, a baseband signal processing section 204 and an application section 205. Note that the user terminal 20 may be configured to include one or more transmitting/receiving antennas 201, one or more amplifying sections 202 and one or more transmitting/receiving sections 203.

Radio frequency signals that are received in the transmitting/receiving antennas 201 are amplified in the amplifying sections 202. The transmitting/receiving sections 203 receive the downlink signals amplified in the amplifying sections 202. The transmitting/receiving sections 203 convert the received signals into baseband signals through frequency conversion, and output the baseband signals to the baseband signal processing section 204. The transmitting/receiving sections 203 can be constituted with transmitters/receivers, transmitting/receiving circuits or transmitting/receiving apparatus that can be described based on general understanding of the technical field to which the present invention pertains. Note that each transmitting/receiving section 203 may be structured as a transmitting/receiving section in one entity, or may be constituted with a transmitting section and a receiving section.

The baseband signal processing section 204 performs, on each input baseband signal, an FFT process, error correction decoding, a retransmission control receiving process, and so on. The downlink user data is forwarded to the application section 205. The application section 205 performs processes related to higher layers above the physical layer and the MAC layer, and so on. In the downlink data, broadcast information may be also forwarded to the application section 205.

Meanwhile, the uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving section 203. The transmitting/receiving sections 203 convert the baseband signals output from the baseband signal processing section 204 to have radio frequency band and transmit the result. The radio frequency signals having been subjected to frequency conversion in the transmitting/receiving sections 203 are amplified in the amplifying sections 202, and transmitted from the transmitting/receiving antennas 201.

The transmitting/receiving sections 203 may receive a synchronization signal block (for example, SSB, SS/PBCH block) including a broadcast channel (for example, PBCH) from a cell.

Figure 11:
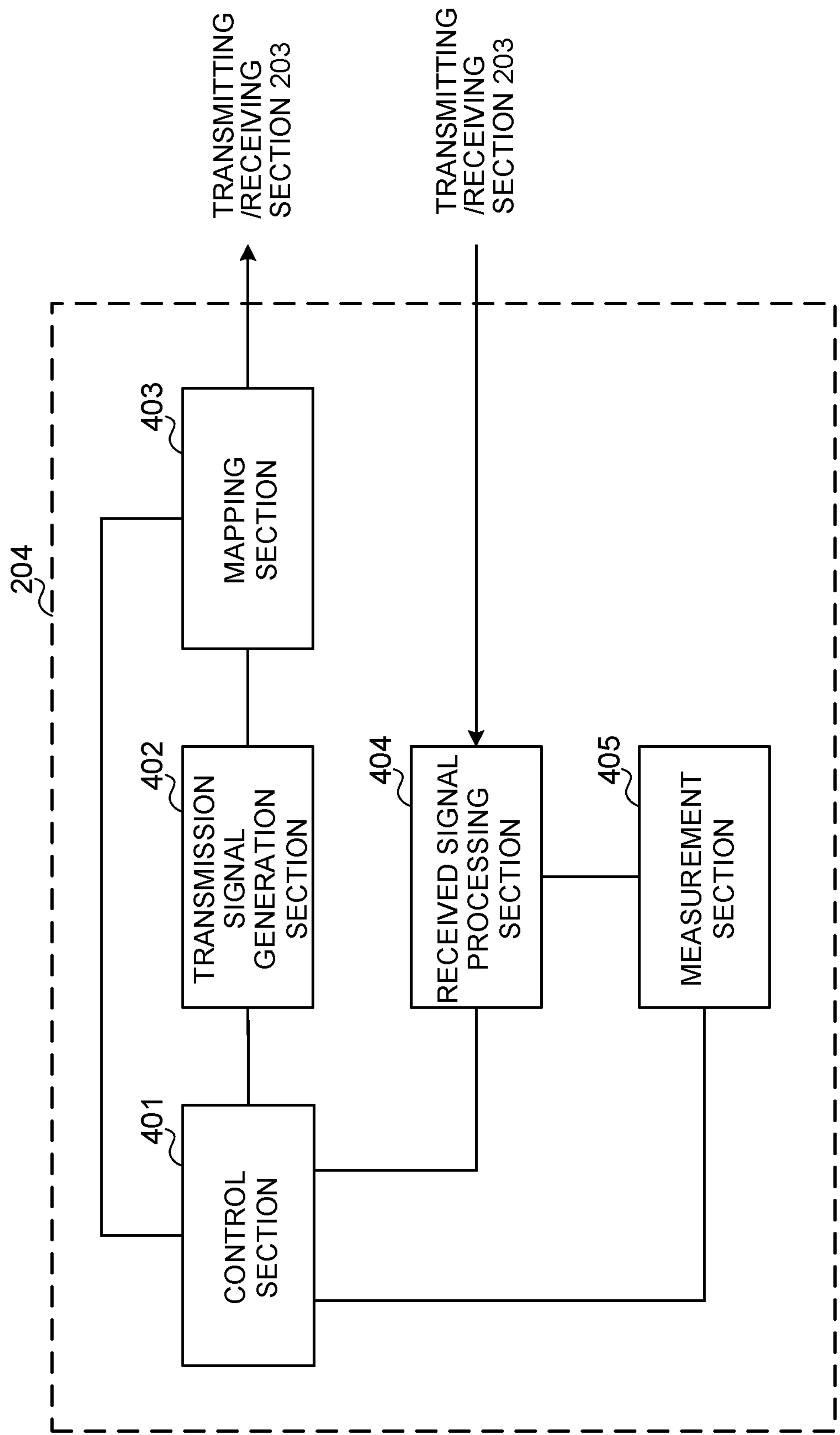
FIG. 11 is a diagram to show an example of a functional structure of the user terminal according to one embodiment of the present invention.

FIG. 11 is a diagram to show an example of a functional structure of a user terminal according to one embodiment of the present invention. Note that, the present example primarily shows functional blocks that pertain to characteristic parts of the present embodiment, and it is assumed that the user terminal 20 may include other functional blocks that are necessary for radio communication as well.

The baseband signal processing section 204 provided in the user terminal 20 at least includes a control section 401, a transmission signal generation section 402, a mapping section 403, a received signal processing section 404 and a measurement section 405. Note that these structures may be included in the user terminal 20, and some or all of the structures do not need to be included in the baseband signal processing section 204.

The control section 401 controls the whole of the user terminal 20. The control section 401 can be constituted with a controller, a control circuit or control apparatus that can be described based on general understanding of the technical field to which the present invention pertains.

The control section 401, for example, controls the generation of signals by the transmission signal generation section 402, the mapping of signals by the mapping section 403, and so on. The control section 401 controls the signal receiving processes by the received signal processing section 404, the measurements of signals by the measurement section 405, and so on.

The control section 401 acquires a downlink control signal and a downlink data signal transmitted from the radio base station 10, from the received signal processing section 404. The control section 401 controls generation of an uplink control signal and/or an uplink data signal, based on the results of determining necessity or not of retransmission control to a downlink control signal and/or a downlink data signal.

If the control section 401 acquires a variety of information signaled by the radio base station 10 from the received signal processing section 404, the control section 401 may update parameters to use for control, based on the information.

The transmission signal generation section 402 generates uplink signals (uplink control signals, uplink data signals, uplink reference signals and so on) based on commands from the control section 401, and outputs the uplink signals to the mapping section 403. The transmission signal generation section 402 can be constituted with a signal generator, a signal generation circuit or signal generation apparatus that can be described based on general understanding of the technical field to which the present invention pertains.

For example, the transmission signal generation section 402 generates an uplink control signal about transmission confirmation information, the channel state information (CSI), and so on, based on commands from the control section 401. The transmission signal generation section 402 generates uplink data signals based on commands from the control section 401. For example, when a UL grant is included in a downlink control signal that is signaled from the radio base station 10, the control section 401 commands the transmission signal generation section 402 to generate the uplink data signal.

The mapping section 403 maps the uplink signals generated in the transmission signal generation section 402 to radio resources, based on commands from the control section 401, and outputs the result to the transmitting/receiving sections 203. The mapping section 403 can be constituted with a mapper, a mapping circuit or mapping apparatus that can be described based on general understanding of the technical field to which the present invention pertains.

The received signal processing section 404 performs receiving processes (for example, demapping, demodulation, decoding and so on) of received signals that are input from the transmitting/receiving sections 203. Here, the received signals are, for example, downlink signals transmitted from the radio base station 10 (downlink control signals, downlink data signals, downlink reference signals and so on). The received signal processing section 404 can be constituted with a signal processor, a signal processing circuit or signal processing apparatus that can be described based on general understanding of the technical field to which the present invention pertains. The received signal processing section 404 can constitute the receiving section according to the present invention.

The received signal processing section 404 outputs the decoded information acquired through the receiving processes to the control section 401. The received signal processing section 404 outputs, for example, broadcast information, system information, RRC signaling, DCI and so on, to the control section 401. The received signal processing section 404 outputs the received signals and/or the signals after the receiving processes to the measurement section 405.

The measurement section 405 conducts measurements with respect to the received signals. The measurement section 405 can be constituted with a measurer, a measurement circuit or measurement apparatus that can be described based on general understanding of the technical field to which the present invention pertains.

For example, the measurement section 405 may perform RRM measurement, CSI measurement, and so on, based on the received signal. The measurement section 405 may measure a received power (for example, RSRP), a received quality (for example, RSRQ, SINR), a signal strength (for example, RSSI), channel information (for example, CSI), and so on. The measurement results may be output to the control section 401.

The control section 401 may interpret (read) a specific information element (for example, at least a part of bits and/or code points of Ssb-IndexExplicit, Ssb-subcarrierOffset, pdcchConfigSIB1, subCarrierSpacingCommon, cellBarred, intraFreqReselection, and spare) in a broadcast channel (for example, PBCH) as a different information element, depending on whether or not a specific condition is satisfied.

The specific condition may be that the received synchronization signal block (for example, SSB, SS/PBCH block) is detected in one of a plurality of frequency locations (for example, SS raster) predefined to place a synchronization signal block for an initial access, and the received synchronization signal block indicates that there is no cell that is capable of camp on in a carrier band of the received synchronization signal block (for example, cellBarred is "Barred," and intraFreqReselection is "not allowed"). The specific information element may be at least a part of an information element about a subcarrier offset of a synchronization signal block (for example, Ssb-IndexExplicit and/or Ssb-subcarrierOffset), an information element about a configuration of a downlink physical control channel (for example, pdcchConfigSIB1), and an information element about a subcarrier spacing (for example, subCarrierSpacingCommon).

The specific condition may be that in a state where the user terminal is connected to a cell, the user terminal is indicated for measurement of a synchronization signal block in a frequency location except a plurality of frequency locations predefined to locate a synchronization signal block for an initial access. The specific information element may be at least a part of an information element about a subcarrier offset of a synchronization signal block (for example, Ssb-IndexExplicit and/or Ssb-subcarrierOffset), an information element about a configuration of a downlink physical control channel (for example, pdcchConfigSIB1), an information element about a subcarrier spacing (for example, subCarrierSpacingCommon), an information element about camp on capability to the cell (for example, cellBarred), and an information element about camp on capability to a carrier band of the cell (for example, intraFreqReselection).

The specific condition may be that in a state where the user terminal is connected to a cell, a specific parameter configured by a higher layer is a specific value. The specific information element may be at least a part of an information element about an index of a synchronization signal block (for example, Ssb-IndexExplicit).

If the specific condition is satisfied, the control section 401 may interpret the specific information element as at least a part of information about a frequency location of a synchronization signal block to search (for example, an SS raster), information about a country code (for example, MCC) and/or a network number (for example, MNC), information about a timing of the received synchronization signal block (for example, timing related information, repetition of the timing related information, information used for decoding of the timing related information), information about a measurement of the received synchronization signal block (for example, measurement related information), information about quasi-co-location between synchronization signal blocks (for example, QCL related information), and information about periodicity of a set of synchronization signal blocks (for example, SS burst set periodicity).

<Hardware Structure>

Note that the block diagrams that have been used to describe the above embodiments show blocks in functional units. These functional blocks (components) may be implemented in arbitrary combinations of hardware and/or software. Also, the method for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire and/or wireless, for example) and using these plurality of pieces of apparatus.

Figure 12:
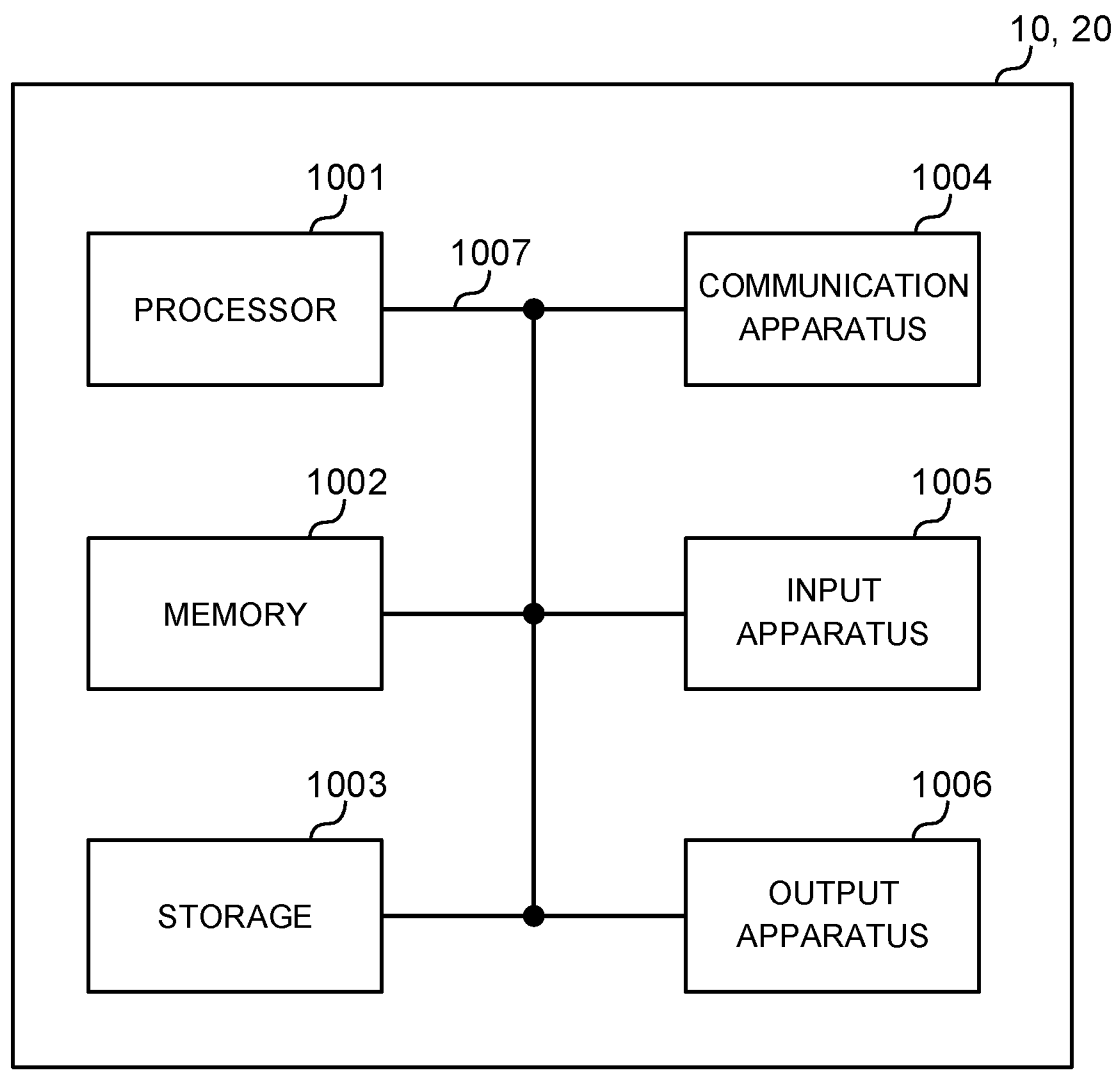
FIG. 12 is a diagram to show an example of a hardware structure of the radio base station and the user terminal according to one embodiment of the present invention.

For example, a radio base station, a user terminal, and so on according to one embodiment of the present invention may function as a computer that executes the processes of the radio communication method of the present invention. FIG. 12 is a diagram to show an example of a hardware structure of a radio base station and a user terminal according to one embodiment of the present invention. Physically, the above-described radio base station 10 and user terminals 20 may each be formed as computer apparatus that includes a processor 1001, a memory 1002, a storage 1003, a communication apparatus 1004, an input apparatus 1005, an output apparatus 1006, a bus 1007, and so on.

Note that, in the following description, the word "apparatus" may be interpreted as "circuit," "device," "unit," and so on. The hardware structure of the radio base station 10 and the user terminals 20 may be designed to include one or more of apparatuses shown in the drawings, or may be designed not to include part of apparatuses.

For example, although only one processor 1001 is shown, a plurality of processors may be provided. Furthermore, processes may be implemented with one processor or may be implemented at the same time, in sequence, or in different manners with one or more processors. Note that the processor 1001 may be implemented with one or more chips.

Each function of the radio base station 10 and the user terminals 20 is implemented, for example, by allowing given software (programs) to be read on hardware such as the processor 1001 and the memory 1002, and by allowing the processor 1001 to perform calculations to control communication via the communication apparatus 1004 and read and/or write data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, the above-described baseband signal processing section 104 (204), call processing section 105, and so on may be implemented by the processor 1001.

Furthermore, the processor 1001 reads programs (program codes), software modules, data, and so on from the storage 1003 and/or the communication apparatus 1004, into the memory 1002, and executes various processes according to these. As for the programs, programs to allow computers to execute at least part of the operations of the above-described embodiments are used. For example, the control section 401 of each user terminal 20 may be implemented by control programs that are stored in the memory 1002 and that operate on the processor 1001, and other functional blocks may be implemented likewise.

The memory 1002 is a computer-readable recording medium, and may be constituted with, for example, at least one of a ROM (Read Only Memory), an EPROM (Erasable Programmable ROM), an EEPROM (Electrically EPROM), a RAM (Random Access Memory), and other appropriate storage media. The memory 1002 may be referred to as a "register," a "cache," a "main memory (primary storage apparatus)," and so on. The memory 1002 can store executable programs (program codes), software modules, and/or the like for implementing a radio communication method according to one embodiment of the present invention.

The storage 1003 is a computer-readable recording medium, and may be constituted with, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via wired and/or wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106, and so on may be implemented by the communication apparatus 1004.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, an LED (Light Emitting Diode) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the radio base station 10 and the user terminals 20 may be structured to include hardware such as a microprocessor, a digital signal processor (DSP), an ASIC (Application-Specific Integrated Circuit), a PLD (Programmable Logic Device), an FPGA (Field Programmable Gate Array), and so on, and part or all of the functional blocks may be implemented by the hardware. For example, the processor 1001 may be implemented with at least one of these pieces of hardware.

(Variations)

Note that the terminology used in this specification and/or the terminology that is needed to understand this specification may be replaced by other terms that convey the same or similar meanings. For example, "channels" and/or "symbols" may be replaced by "signals" ("signaling"). Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency," and so on.

Furthermore, a radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may have a fixed time length (for example, 1 ms) independent of numerology.

Furthermore, a slot may be constituted of one or a plurality of symbols in the time domain (OFDM (Orthogonal Frequency Division Multiplexing) symbols, SC-FDMA (Single Carrier Frequency Division Multiple Access) symbols, and so on). Furthermore, a slot may be a time unit based on numerology. A slot may include a plurality of mini-slots. Each mini-slot may be constituted of one or a plurality of symbols in the time domain. A mini-slot may be referred to as a "sub-slot."

A radio frame, a subframe, a slot, a mini-slot, and a symbol all express time units in signal communication. A radio frame, a subframe, a slot, a mini-slot, and a symbol may each be called by other applicable terms. For example, one subframe may be referred to as a "transmission time interval (TTI)," a plurality of consecutive subframes may be referred to as a "TTI," or one slot or one mini-slot may be referred to as a "TTI." That is, a subframe and/or a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a radio base station schedules the allocation of radio resources (such as a frequency bandwidth and transmission power that are available for each user terminal) for the user terminal in TTI units. Note that the definition of TTIs is not limited to this.

TTIs may be transmission time units for channel-encoded data packets (transport blocks), code blocks, and/or codewords, or may be the unit of processing in scheduling, link adaptation, and so on. Note that, when TTIs are given, the time interval (for example, the number of symbols) to which transport blocks, code blocks and/or codewords are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in LTE Rel. 8 to Rel. 12), a "long TTI," a "normal subframe," a "long subframe," and so on. A TTI that is shorter than a normal TTI may be referred to as a "shortened TTI," a "short TTI," a "partial or fractional TTI," a "shortened subframe," a "short subframe," a "mini-slot," a "sub-slot," and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. Also, an RB may include one or a plurality of symbols in the time domain, and may be one slot, one mini-slot, one subframe, or one TTI in length. One TTI and one subframe each may be constituted of one or a plurality of resource blocks. Note that one or a plurality of RBs may be referred to as a "physical resource block (PRB (Physical RB))," a "sub-carrier group (SCG)," a "resource element group (REG)," a "PRB pair," an "RB pair," and so on.

Furthermore, a resource block may be constituted of one or a plurality of resource elements (REs). For example, one RE may correspond to a radio resource region of one subcarrier and one symbol.

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in this specification may be represented in absolute values or in relative values with respect to given values, or may be represented in another corresponding information. For example, radio resources may be specified by given indices.

The names used for parameters and so on in this specification are in no respect limiting. For example, since various channels (PUCCH (Physical Uplink Control Channel), PDCCH (Physical Downlink Control Channel), and so on) and information elements can be identified by any suitable names, the various names assigned to these individual channels and information elements are in no respect limiting.

The information, signals, and/or others described in this specification may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output from higher layers to lower layers and/or from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Signaling of information is by no means limited to the aspects/embodiments described in this specification, and other methods may be used as well. For example, signaling of information may be implemented by using physical layer signaling (for example, downlink control information (DCI), uplink control information (UCI), higher layer signaling (for example, RRC (Radio Resource Control) signaling, broadcast information (master information block (MIB), system information blocks (SIBs), and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)," and so on. Also, RRC signaling may be referred to as an "RRC message," and can be, for example, an RRC connection setup (RRCConnectionSetup) message, an RRC connection reconfiguration (RRCConnectionReconfiguration) message, and so on. Also, MAC signaling may be signaled using, for example, MAC control elements (MAC CEs).

Also, signaling of given information (for example, signaling of "X holds") does not necessarily have to be signaled explicitly, and can be signaled implicitly (by, for example, not signaling this given information or signaling another piece of information).

Determinations may be made in values represented by one bit (0 or 1), may be made in Boolean values that represent true or false, or may be made by comparing numerical values (for example, comparison against a given value).

Software, whether referred to as "software," "firmware," "middleware," "microcode," or "hardware description language," or called by other names, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using wired technologies (coaxial cables, optical fiber cables, twisted-pair cables, digital subscriber lines (DSL), and so on) and/or wireless technologies (infrared radiation, microwaves, and so on), these wired technologies and/or wireless technologies are also included in the definition of communication media.

The terms "system" and "network" as used herein are used interchangeably.

In the present specification, the terms "base station (BS)," "radio base station," "eNB," "gNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell," and so on.

A base station can accommodate one or a plurality of (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part of or the entire coverage area of a base station and/or a base station subsystem that provides communication services within this coverage.

In the present specification, the terms "mobile station (MS)," "user terminal," "user equipment (UE)," and "terminal" may be used interchangeably. A base station may be referred to as a "fixed station," "NodeB," "eNodeB (eNB)," "access point," "transmission point," "receiving point," "femto cell," "small cell," and so on.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases by those skilled in the art.

Furthermore, the radio base stations in this specification may be interpreted as user terminals. For example, each aspect/embodiment of the present invention may be applied to a configuration in which communication between a radio base station and a user terminal is replaced with communication among a plurality of user terminals (D2D (Device-To-Device)). In this case, the user terminals 20 may have the functions of the radio base stations 10 described above. In addition, wording such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

Actions which have been described in this specification to be performed by a base station may, in some cases, be performed by upper nodes. In a network including one or a plurality of network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The aspects/embodiments illustrated in this specification may be used individually or in combinations, which may be switched depending on the mode of implementation. The order of processes, sequences, flowcharts, and so on that have been used to describe the aspects/embodiments herein may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR(New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate radio communication methods and/or next-generation systems that are enhanced based on these.

The phrase "based on" (or "on the basis of") as used in this specification does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used herein does not generally limit the quantity or order of these elements. These designations may be used herein only for convenience, as a method for distinguishing between two or more elements. Thus, reference to the first and second elements does not imply that only two elements may be employed, or that the first element must precede the second element in some way.

The term "judging (determining)" as used herein may encompass a wide variety of actions. For example, "judging (determining)" may be interpreted to mean making "judgments (determinations)" about calculating, computing, processing, deriving, investigating, looking up (for example, searching a table, a database, or some other data structures), ascertaining, and so on. Furthermore, "judging (determining)" may be interpreted to mean making "judgments (determinations)" about receiving (for example, receiving information), transmitting (for example, transmitting information), input, output, accessing (for example, accessing data in a memory), and so on. In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

The terms "connected" and "coupled," or any variation of these terms as used herein mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In this specification, when two elements are connected, the two elements may be considered "connected" or "coupled" to each other by using one or more electrical wires, cables and/or printed electrical connections, and, as some non-limiting and non-inclusive examples, by using electromagnetic energy having wavelengths in radio frequency regions, microwave regions, (both visible and invisible) optical regions, or the like.

In this specification, the phrase "A and B are different" may mean that "A and B are different from each other." The terms "separate," "be coupled," and so on may be interpreted similarly.

When terms such as "including," "comprising," and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

What is claimed is:

1. A terminal comprising:

a receiver that detects a synchronization signal block including a broadcast channel including an information element for indicating a control resource set (CORESET) for receiving a system information block; and a processor that interprets the information element differently depending on whether a condition is met, wherein the condition comprises at least one of:

the system information block associated with the synchronization signal block not being present, and the CORESET for receiving the system information block associated with the synchronization signal block not being present, and wherein when the condition is met, the information element indicates a synchronization raster range in which the subsequent synchronization signal block, associated with the system information block, is not present.

2. A radio communication method for a terminal comprising:

detecting a synchronization signal block including a broadcast channel including an information element for indicating a control resource set (CORESET) for receiving a system information block; and interpreting the information element differently depending on whether a condition is met, wherein the condition comprises at least one of:

the system information block associated with the synchronization signal block not being present, and the CORESET for receiving the system information block associated with the synchronization signal block not being present, and wherein when the condition is met, the information element indicates a synchronization raster range in which the subsequent synchronization signal block, associated with the system information block, is not present.

3. A base station comprising:

a processor that interprets an information element differently depending on whether a condition is met, the information element being for indicating a control resource set (CORESET) for receiving a system information block; and a transmitter that transmits a synchronization signal block including a broadcast channel including the information element, wherein the condition comprises at least one of:

the system information block associated with the synchronization signal block not being present, and set (CORESET) the CORESET for receiving the system information block associated with the synchronization signal block not being present, and wherein when the condition is met, the information element indicates a synchronization raster range in which the subsequent synchronization signal block, associated with the system information block, is not present.

4. A system comprising:

a terminal that comprises:

a receiver that detects a synchronization signal block including a broadcast channel including an information element for indicating a control resource set (CORESET) for receiving a system information block; and a processor that interprets the information element differently depending on whether a condition is met; and a base station that transmits the synchronization signal block, wherein the condition comprises at least one of:

the system information block associated with the synchronization signal block not being present, and the CORESET for receiving the system information block that is associated with the synchronization signal block not being present, and wherein when the condition is met, the information element indicates a synchronization raster range in which the subsequent synchronization signal block, associated with the system information block, is not present.

5. The terminal according to claim 1, wherein when the condition is met, the processor interprets the information element as information on quasi co-location between synchronization signal blocks.

* * * * *